(12) United States Patent
Mori et al.

(10) Patent No.: US 7,860,397 B2
(45) Date of Patent: Dec. 28, 2010

(54) WAVELENGTH SUPERIMPOSING DEVICE, MANUFACTURING METHOD THEREFOR, AND WDM NETWORK SYSTEM

(75) Inventors: Kazuyuki Mori, Kawasaki (JP); Koji Terada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 980 days.

(21) Appl. No.: 11/655,177

(22) Filed: Jan. 19, 2007

(65) Prior Publication Data

US 2008/0069566 A1 Mar. 20, 2008

(30) Foreign Application Priority Data

Sep. 14, 2006 (JP) .............................. 2006-249712

(51) Int. Cl.
*H04J 14/02* (2006.01)

(52) U.S. Cl. .............................. 398/85; 398/84; 398/83; 398/82; 398/87

(58) Field of Classification Search .................. 398/85, 398/84, 83, 82, 79, 87, 68
See application file for complete search history.

(56) References Cited

U.S. PATENT DOCUMENTS

| | | | | |
|---|---|---|---|---|
| 5,262,895 A | * | 11/1993 | LaDuke et al. .............. | 359/634 |
| 5,321,541 A | * | 6/1994 | Cohen .......................... | 398/82 |
| 7,546,036 B2 | * | 6/2009 | Bouda et al. .................. | 398/72 |
| 7,639,946 B2 | * | 12/2009 | Bouda ......................... | 398/68 |
| 2004/0033014 A1 | * | 2/2004 | Sasaki et al. ................. | 385/24 |
| 2008/0031625 A1 | * | 2/2008 | Okuda et al. ................. | 398/71 |

FOREIGN PATENT DOCUMENTS

| | | |
|---|---|---|
| JP | 2001-21741 | 1/2001 |
| JP | 2005-321487 | 11/2005 |

* cited by examiner

*Primary Examiner*—Ken N Vanderpuye
*Assistant Examiner*—Hibret A Woldekidan
(74) *Attorney, Agent, or Firm*—Staas & Halsey LLP

(57) ABSTRACT

The present invention is a wavelength superimposing device that can restrain a system scale and further reduce an optical transmission loss, while broadcasting a video signal light in a WDM network system, a manufacturing method therefor, and the WDM network system, and comprises a filter device that reflects some light of an input wavelength-multiplexed light in a direction different from an optical path direction of the input wavelength-multiplexed light and transmits a light of remaining wavelengths, a first optical system in which a reflected light reflected by the filter device is re-incident on a plurality of incident positions on a reflecting surface of the filter device, and a second optical system in which a transmitted light from the filter device is spectrally separated for each wavelength and each separated light is incident on the plurality of incident positions from a transmission surface of the filter device.

19 Claims, 17 Drawing Sheets

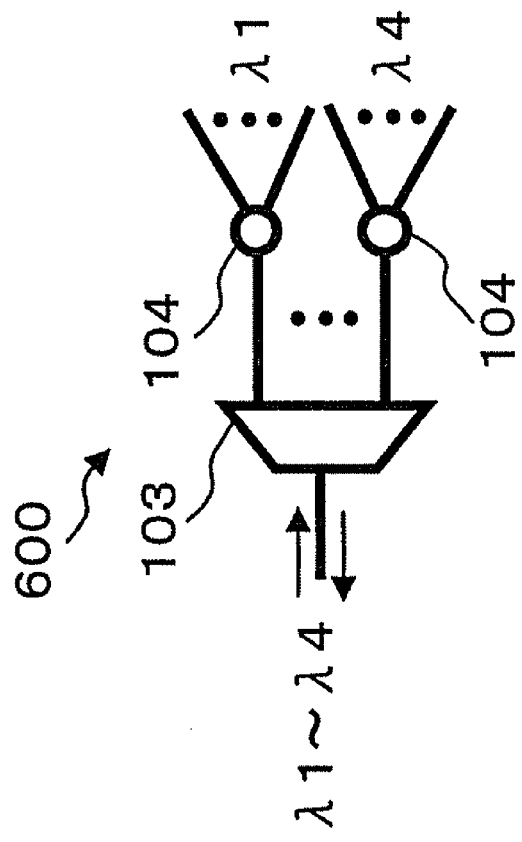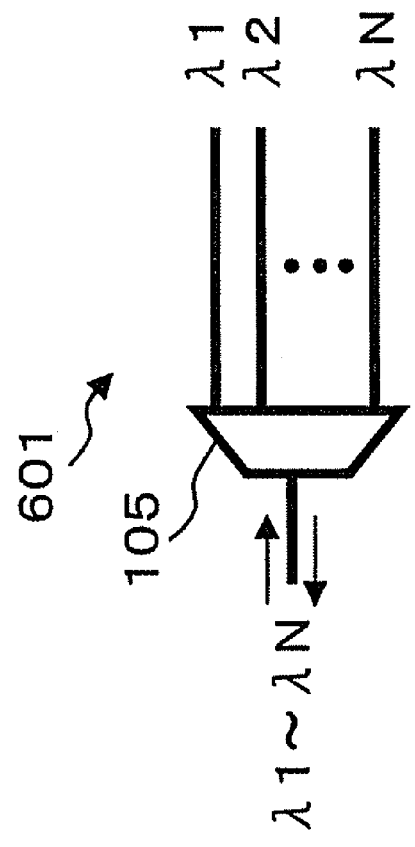
FIG. 16(a) RELATED ART
FIG. 16(b) RELATED ART

WAVELENGTH SUPERIMPOSING DEVICE, MANUFACTURING METHOD THEREFOR, AND WDM NETWORK SYSTEM

CROSS REFERENCE TO RELATED APPLICATION(S)

This application is based on and hereby claims priority to Japanese Application No. 2006-249712 filed on Sep. 14, 2006 in Japan, the contents of which are hereby incorporated by reference.

BACKGROUND OF THE INVENTION

1) Field of the Invention

The present invention relates to a wavelength superimposing device, a manufacturing method therefor, and a wavelength division multiplexing (WDM) network system, and, for example, relates to a technique suitable for use in a system in which a wavelength division multiplexing-passive optical network (WDM-PON) is adopted.

2) Description of the Related Art

Nowadays, as a subscriber optical fiber network system intended for subscriber (user) homes such as ordinary households, for example, a system connecting an optical line terminal (station) provided in a regional office set up in a central station or the like and optical network units set up in a plurality of subscriber homes using optical fibers is known. Among others, a configuration in which one optical fiber that performs input/output of an optical data signal (frame) from a regional office is branched off in a plurality of destinations by a power splitter, which is a passive element, and an optical network unit of each subscriber home is connected to each of the branched optical fibers is called a passive optical network (PON) system.

The PON system has been in practical use as a system that can perform data transmission at high speed between an optical line terminal and a plurality of subscribers' houses.

Then, a system configuration shown, for example, in FIG. 15 can be cited as a form of the PON system.

A PON system 300 shown in FIG. 15 is comprised of an optical line terminal (OLT) 100, N (N is an integer equal to or greater than 2) optical network units (ONU) 200-1 to 200-N (denoted simply as an ONU 200 if not distinguished) corresponding to subscribers #1 to #N, a power splitter 102, an optical fiber 400 connecting the OLT 100 and the power splitter 102, optical fibers 500-1 to 500-N (denoted simply as an optical fiber 500 if not distinguished) connecting the power splitter 102 and each of the ONU 200-1 to 200-N, and a wavelength filter 101 provided at some midpoint of the optical fiber 400.

In the PON system 300, the OLT 100 is a device equipped with required communication control functions such as converting an electric signal into an optical signal to send the optical signal in a predetermined downstream frame format (hereinafter referred to simply as a "downstream frame") to the ONU 200 for delivery of information or the like or converting data transmitted as an optical signal in a predetermined upstream frame format (hereinafter referred to simply as a "upstream frame") from the ONU 200 into an electric signal. Meanwhile, a downstream direction is from the OLT 100 to the ONU 200 and an upstream direction is from the ONU 200 to the OLT 100.

The optical fiber 400 connected to the OLT 100 is branched off by the power splitter 102 provided midway through a transmission path and each branched optical fiber 500 is drawn into an individual subscriber home to be connected to each ONU 200.

The ONU 200 is a device that performs communication control operations such as communication with the OLT 100 and conversion between optical signals and electric signals.

The power splitter 102 divides a downstream signal from one optical fiber 400 into a plurality of optical fibers 500 (power branching) and collects (multiplexing) upstream signals from a plurality of optical fibers 500 into one optical fiber 400.

Here, upstream and downstream data transmission between the OLT 100 and the power splitter 102 is performed bidirectionally by wavelength division multiplexing (WDM) using one optical fiber 400.

The wavelength filter 101 is used to transmit data in downstream frames and upstream frames while multiplexing an analog video signal transmitted (broadcasted) uniformly to the subscribers #1 to #N into an optical signal in the downstream direction.

In the downstream direction from the OLT 100 to the ONU 200, for example, video signal light in a 1.55 μm band to be multiplexed by the wavelength filter 101 is transmitted along with an optical signal in a 1.49 μm band by time division multiplexing (TDM). Then, in the ONU 200, after demultiplexing a downstream frame and the video signal light by, for example, a wavelength filter (not shown), the video signal light is received by, for example, a receiver for video signal light (not shown) and frame synchronization information and management information are detected in the downstream frame, and based on the detected information, reception processing is performed by extracting data of time slots individually assigned in advance.

In the upstream direction from the ONU 200 to the OLT 100, on the other hand, an upstream frame from each ONU 200 is transmitted as an optical signal in a 1.31 μm band by time division multiple access (TDMA) at a timing to avoid collision of each frame. Each ONU 200 is notified of access timing of TDMA by, for example, the management information.

As optical devices that are applicable instead of the power splitter 102 in the PON system 300, techniques proposed in Japanese Patent Application Laid-Open No. 2005-321487 and Japanese Patent Application Laid-Open No. 2001-021741 shown below exist.

Now, with the increasing number of subscribers in recent years, further improvement in speed and broader bands of the PON system 300 have been demanded. Thus, as a next-generation PON system, a WDM-PON system using WDM that performs user (subscriber) multiplexing on an wavelength axis in the downstream direction and upstream direction respectively is considered.

Since, in the WDM-PON system, a different wavelength is assigned to each user, instead of the power splitter 102 used in the PON system 300 described above, for example, a multiplexing/demultiplexing device 600 shown in FIG. 16(a) or a multiplexing/demultiplexing device 601 shown in FIG. 16(b) is used. Though an illustration of the OLT 100 and ONU 200 is not shown in FIG. 16(a) and FIG. 16(b), the OLT 100 is for example connected to both the multiplexing/demultiplexing devices 600 and 601 to the left of the page and each ONU 200 is connected to the right of the page.

The multiplexing/demultiplexing device 600 shown in FIG. 16(a) is comprised of, for example, a coarse wavelength division multiplexing (CWDM) multi/demultiplexer 103 such as an arrayed waveguide grating (AWG) and a plurality of power splitters 104.

In the multiplexing/demultiplexing device 600, the CWDM multi/demultiplexer 103 is used to demultiplex an input light in which an optical signal of a plurality of wavelengths (for example, wavelengths λ1 to λ4 in the figure) is wavelength-multiplexed into each wavelength and, at the same time, to multiplex each optical signal of a plurality of wavelengths in an opposite direction of the input light to output a wavelength-multiplexed optical signal. The power splitters 104 are used to divide a downstream optical signal from the CWDM multi/demultiplexer 103 into ONU 200 (power branching) and, at the same time, to multiplex each upstream optical signal from the ONU 200.

By using the multiplexing/demultiplexing device 600 in the PON system 300 instead of the power splitter 102 as described above, in the example shown in FIG. 16(a), the number of wavelengths used for optical transmission can maximally be quadrupled to realize further improvement in speed and broader bands of the PON system 300 in response to the increasing number of users.

If, instead of the power splitter 102, the multiplexing/demultiplexing device 601 shown in FIG. 16(b) is used, a downstream optical signal from the OLT 100 in which an optical signal of a plurality of wavelengths (for example, wavelengths λ1 to λN in the figure) is wavelength-multiplexed is demultiplexed into each wavelength by a dense wavelength division multiplexing (DWDM) multi/demultiplexer 105 before being transmitted to each ONU 200 assigned in advance. Each upstream optical signal of a plurality of wavelengths from each ONU 200, on the other hand, is multiplexed by the DWDM multi/demultiplexer 105 before being transmitted to the OLT 100 as a wavelength-multiplexed optical signal.

If, instead of the power splitter 102, the multiplexing/demultiplexing device 601 is used in the PON system 300, as described above, since one wavelength can be assigned to each user, it becomes possible not only to achieve further improvement in speed and broader bands of the PON system 300 in response to the increasing number of users, but also to constitute a more flexible network system.

In addition, an optical waveguide WDM multi/demultiplexer proposed in Japanese Patent Application Laid-Open No. 2005-321487 is available.

However, if the power splitter 102 is replaced (upgraded) by the multiplexing/demultiplexing device 600 or 601 in the PON system 300, as described above, simple power branching of a video signal light cannot be performed due to the presence of the CWDM multi/demultiplexer 103 or DWDM multi/demultiplexer 105 having wavelength dependence so that broadcasting to each ONU 200 cannot be carried out as before. Thus, a method of making the PON system 300 faster and bands broader is needed while retaining a function of broadcasting a video signal light.

So, instead of the power splitter 102, for example, a multiplexing/demultiplexing device 602 shown in FIG. 17 can be used.

The multiplexing/demultiplexing device 602 is comprised of, for example, a WDM filter 106 which multiplexes/demultiplexes a wavelength-multiplexed light of wavelengths λ1 to λN and a video signal light of the wavelength λvideo, a WDM multi/demultiplexer 109 which multiplexes/demultiplexes a wavelength-multiplexed light in which light of the wavelengths λ1 to λN is wavelength-multiplexed, a power splitter 107 which divides a video signal light of the wavelength λvideo (power branching), and WDM multi/demultiplexers 108-1 to 108-N (denoted simply as a WDM multi/demultiplexer 108 when not distinguished) which multiplexes/demultiplexes a video signal light of the wavelength λvideo and one of light signals of the wavelengths λ1 to λN. Though an illustration of the OLT 100 and ONU 200 is not shown in the configuration shown in FIG. 17, for example, the OLT 100 is connected to the left of the page and each ONU 200 is connected to the right of the page.

With such a configuration, a wavelength-multiplexed light of the wavelengths λ1 to λN is demultiplexed into each wavelength by the WDM multi/demultiplexer 109 and a light of each wavelength is transmitted to the ONU 200 assigned in advance. A video signal light of the wavelength λvideo, on the other hand, is demultiplexed in the downstream direction by the WDM multi/demultiplexer 106 and further power-branched evenly by the power splitter 107, and then multiplexed with one of downstream optical signals of the wavelengths λ1 to λN by the WDM multi/demultiplexer 108 before being transmitted (broadcasted) to each ONU 200.

The video signal light of the wavelength λvideo is demultiplexed in the upstream direction by the WDM multi/demultiplexer 108 and further collected (multiplexed) by the power splitter 107, and then multiplexed with a wavelength-multiplexed optical signal in the upstream direction of the wavelengths λ1 to λN by the WDM multi/demultiplexer 106 before being transmitted to the OLT 100.

In addition, for example, an optical waveguide proposed in Japanese Patent Application Laid-Open No. 2001-021741 is available as a technique that can be applied to realize broadcasting of a video signal light in the PON system.

However, if the configuration shown in FIG. 17 is used, as described above, there is a splice problem in which discrete components (WDM filters 106 and 108) cannot be freely detached/attached and there is also a problem of increasing device size of the multiplexing/demultiplexing device 602 due to fiber remaining length handling, for example.

Also, if the technique described in Japanese Patent Application Laid-Open No. 2001-021741 is used, there is a problem that a transmission light loss increases (for example, the loss amounts to 10 dB or more) because an optical path length in an optical waveguide becomes longer.

SUMMARY OF THE INVENTION

The present invention has been developed in view of the above problems and an object thereof is to provide, in a WDM network system such as a PON system, a wavelength superimposing device that can restrain a system scale and further reduce an optical transmission loss, while realizing a broadcast function of a video signal light, and a manufacturing method therefor. Another object of the present invention is to provide a WDM network system using the wavelength superimposing device.

To achieve the above objects, the present invention is characterized in that a wavelength superimposing device shown below, a manufacturing method therefor, and a WDM network system are used. That is:

(1) A wavelength superimposing device according to the present invention comprises a filter device that reflects a light of a portion of wavelengths of an input wavelength-multiplexed light in a direction different from an optical path direction of the input wavelength-multiplexed light and transmits a light of remaining wavelengths, a first optical system in which a reflected light reflected by the filter device is re-incident on a plurality of incident positions on a reflecting surface of the filter device, and a second optical system in which a transmitted light from the filter device is spectrally separated for each wavelength and each separated light is incident on the plurality of incident positions from a transmission surface of the filter device.

(2) Here, the first optical system may be constituted as a first reflective optical system in which the reflected light is reflected at spatially different positions before each reflected light is incident on the incident positions in parallel with the input wavelength-multiplexed light and the second optical system may be constituted as a second reflective optical system in which the transmitted light is reflected at spatially different positions for each of the wavelengths before a light of each wavelength is incident on the incident positions.

(3) Also, the first reflective optical system may be constituted by comprising a plurality of reflector elements provided at different positions on an optical path of the reflected light to reflect at least a portion of the reflected light in a direction of the incident position and the second reflective optical system may be constituted by comprising a plurality of filter elements provided at different positions on an optical path of the transmitted light to reflect a light of any wavelength contained in the transmitted light in the direction of the incident position and transmit a light of remaining wavelengths.

(4) Further, each of the filter device, the reflector element in the first reflective optical system, and the filter element in the second reflective optical system may be constructed from a dielectric multilayer filter formed on a substrate with each of the substrates laminated and the filter device taking a central position.

(5) Also, a light of the portion of wavelengths reflected by the filter device may be a signal light in a downstream direction to be delivered to a plurality of optical network units constituting a WDM network system and a light of the remaining wavelengths transmitted through the filter device may be a signal light in the downstream direction to be transmitted to the individual optical network units by each wavelength.

(6) Further, the filter device may have properties that a light incident on the incident position from an opposite direction of the reflected light is reflected in the opposite direction on a re-incident path of the reflected light and the first optical system may have properties that a light reflected in the opposite direction from the incident position of the filter device is output in the opposite direction of the input wavelength-multiplexed light from the incident position of the input wavelength-multiplexed light.

(7) Also, the portion of light reflected by the filter device may be a video signal light.

(8) Further, an incidence angle with the reflecting surface of the filter device of the input wavelength-multiplexed light may be set to 45°.

(9) A WDM network system according to the present invention has a plurality of optical network units, an optical line terminal for transmitting a light of a plurality of wavelengths to be transmitted to the plurality of optical network units by wavelength-multiplexing the light, and a wavelength superimposing device that receives a wavelength-multiplexed light from the optical line terminal and transmits the wavelength-multiplexed light to the plurality of optical network units, wherein the wavelength superimposing device comprises a filter device that reflects a light of a portion of wavelengths of an input wavelength-multiplexed light, which is a signal light in a downstream direction from the optical line terminal, in a direction different from an optical path direction of the input wavelength-multiplexed light as a light to be delivered to the plurality of optical network units and transmits a light of remaining wavelengths as a light to be transmitted to the individual optical network units by each wavelength, a first optical system in which a reflected light reflected by the filter device is re-incident on a plurality of incident positions on a reflecting surface of the filter device, and a second optical system in which a transmitted light from the filter device is spectrally separated for each wavelength and each separated light is incident on the plurality of incident positions from a transmission surface of the filter device.

(10) A method of manufacturing a wavelength superimposing device according to the present invention comprises a first process in which a first dielectric multilayer that reflects a light of a portion of wavelengths of an input wavelength-multiplexed light and transmits a light of remaining wavelengths is formed on one surface of a first substrate, a second dielectric multilayer that reflects a light of the portion of wavelengths is formed in a portion of one surface of each of a plurality of second substrates, and a third dielectric multilayer that reflects one of the remaining wavelengths is formed on one surface of each of a plurality of third substrates, a second process in which each of the substrates is laminated and pasted with the first substrate taking the central position, and a third process in which a layered product manufactured in the second process is molded so that the plurality of second substrates and dielectric multilayers constitute a first optical system in which a reflected light reflected by the first dielectric multilayer is re-incident on a plurality of incident positions of the first dielectric multilayer and the plurality of third substrates and dielectric multilayers constitute a second optical system in which a transmitted light from the first dielectric multilayer is spectrally separated for each wavelength and each separated light is incident on the plurality of incident positions from a transmission surface of the first dielectric multilayer.

According to the present invention described above, at least one of effects or advantages described below will be obtained:

(1) A wavelength superimposing device according to the present invention comprises a filter device that reflects a light of a portion of wavelengths of an input wavelength-multiplexed light in a direction different from an optical path direction of the input wavelength-multiplexed light and transmits a light of remaining wavelengths, a first optical system in which a reflected light reflected by the filter device is re-incident on a plurality of incident positions on a reflecting surface of the filter device, and a second optical system in which a transmitted light from the filter device is spectrally separated for each wavelength and each separated light is incident on the plurality of incident positions from a transmission surface of the filter device. Since this makes it possible for a light of a portion of wavelengths of an input wavelength-multiplexed light to be branched off in a plurality of optical paths and for an input wavelength-multiplexed light of other wavelengths to be branched off in the plurality of optical paths for each wavelength, while transmitting an input wavelength-multiplexed light by separating the input light spectrally for each wavelength addressed to each optical network unit without requiring a discrete component as before, a light of a portion of wavelengths of the input wavelength-multiplexed light can be superimposed on each light of these wavelengths for delivery (broadcasting).

(2) Also, since an optical path length between input/output paths can be made shorter when compared with a case in which an optical waveguide technique is used by constructing each of the filter device, first optical system, and second optical system from a dielectric multilayer formed on a substrate such as a glass substrate, an optical loss of transmission light can significantly be reduced, enabling realization of broadcast communication at a low loss.

(3) Further, since the number of mirrors needed for the first optical system can be reduced by ingeniously designing reflection positions and transmission positions of a light of a portion of wavelengths of an input wavelength-multiplexed light in the first optical system and the number (types) of wavelength filters needed for the second optical system can be reduced by ingeniously designing reflection positions and transmission positions of a light of the remaining wavelengths and wavelength filter characteristics in the second optical system, a cost of a wavelength superimposing device equipped with functions equivalent to those of the above-described wavelength superimposing device can further be reduced.

(4) Also, according to the method of manufacturing a wavelength superimposing device in the present invention, the structure of a wavelength superimposing device can be simplified by constructing each of the filter device, reflector elements in the first optical system, and filter elements in the second optical system from a dielectric multilayer formed on substrates and each of the substrates is laminated into a structure in which the filter device takes the central position. Thus, a manufacturing process thereof can be simplified and also the size as a wavelength superimposing device and manufacturing costs can be suppressed.

(5) Further, since the process of manufacturing the wavelength superimposing device can still be simplified by setting the incidence angle of the input wavelength-multiplexed light with the reflecting surface of the filter device to 45°, a cost of the wavelength superimposing device can still be reduced.

(6) Also, since operation effects similar to those described above can be obtained even if the incidence angle of the input wavelength-multiplexed light with the wavelength superimposing device is set to an angle other than 45°, installation space of the wavelength superimposing device can flexibly be dealt with.

(7) According to the WDM network system in the present invention, if the filter device have properties that a light incident on the incident position from an opposite direction of the reflected light is reflected in the opposite direction on a re-incident path of the reflected light and the first optical system have properties that each light reflected in the opposite direction from the incident position of the filter device is output in the opposite direction of the input wavelength-multiplexed light from the incident position of the input wavelength-multiplexed light, it becomes possible to realize a bidirectional WDM network system at a lower loss, on a smaller scale, and at a lower cost than before because a portion of light incident on the incident position from the opposite direction of the reflected light can be multiplexed for transmission.

BRIEF DESCRIPTION OF THE DRAWINGS

FIG. 16($a$) is a diagram illustrating an example of the configuration of a related multiplexing/demultiplexing device;

FIG. 16($b$) is a diagram illustrating an example of the configuration of a related multiplexing/demultiplexing device;

DESCRIPTION OF PREFERRED EMBODIMENT

An embodiment of the present invention and modifications thereof will be described using drawings below.

[A] Description of an Embodiment of the Wavelength Superimposing Device

Figure 1:
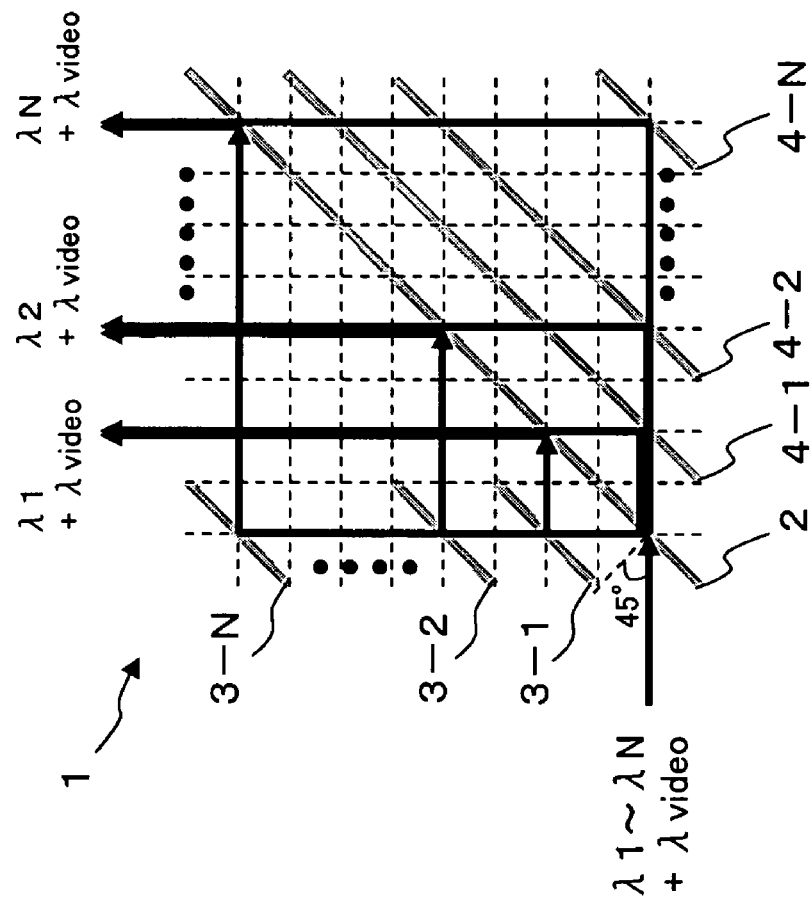
FIG. 1 is a schematic diagram showing a configuration of a wavelength superimposing device according to an embodiment of the present invention together with optical paths.

FIG. 1 is a schematic diagram showing the configuration of a wavelength superimposing device according to an embodiment of the present invention together with optical paths. A wavelength superimposing device 1 shown in FIG. 1 has a rectangular parallelepiped shape and is comprised of a wavelength filter (filter device) 2, reflecting mirrors (reflector elements) 3-1 to 3-N (N is an integer equal to or greater than 2), and wavelength filters (filter elements) 4-1 to 4-N.

Though an illustration of an OLT and ONUs is omitted in the configuration shown in FIG. 1, an OLT is connected, for example, to the left of the page of the present wavelength superimposing device 1 and a wavelength-multiplexed light of wavelengths $\lambda 1$ to $\lambda N$ and a wavelength $\lambda$video of a video signal light (it is assumed, however, that $\lambda 1$ to $\lambda N < \lambda$video in the present example) is to be input from the OLT to a side edge (a portion where the wavelength filter 2 is formed, which may be referred to as an input port below) of the present wavelength superimposing device 1. Also, each ONU is connected upward in the page of FIG. 1 and one of lights obtained by superimposing the video signal light of the wavelength $\lambda$video on each light of the wavelengths $\lambda 1$ to $\lambda N$ emitted in parallel from a plurality (N) of portions (may be referred to as output ports below) on another side (emission plane) at right angles with the side (incidence plane) of the present wavelength superimposing device 1 is to be received by each ONU.

Also, the present wavelength superimposing device 1 is formed such that the wavelength filter 2, the reflecting mirror 3-$i$ ($i$=1 to N), and the wavelength filter 4-$i$ form an arrangement angle of, for example, 45° with respect to an incidence direction of the input wavelength-multiplexed light.

Figure 2:
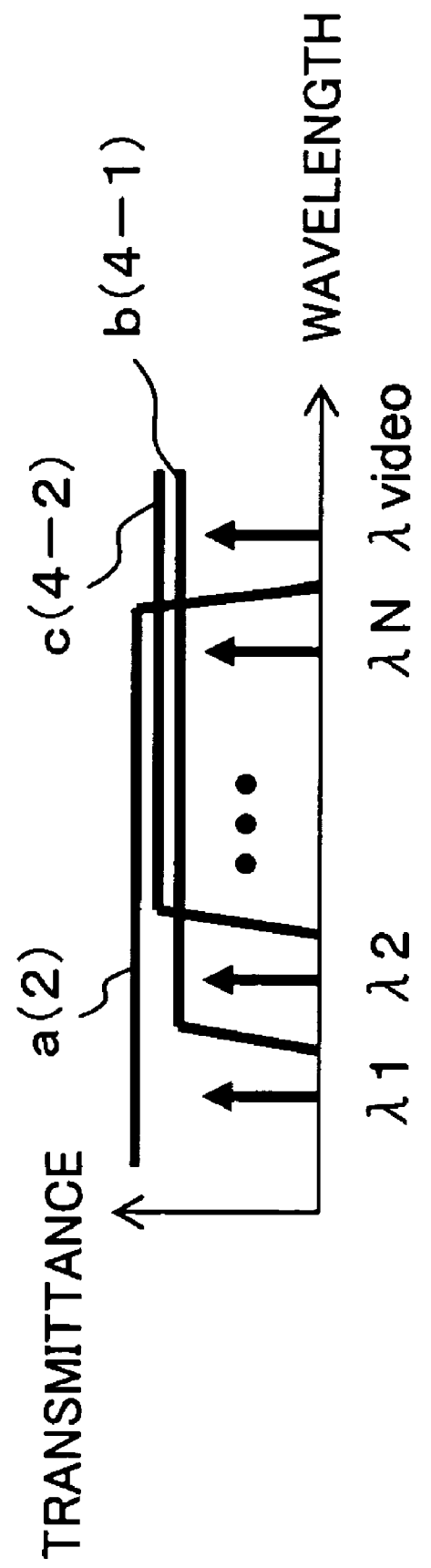
FIG. 2 is a diagram showing a filter characteristic of a wavelength filter shown in FIG. 1.

Here, the wavelength filter (referred to as a video filter below) 2 has, as shown, for example, by a symbol a in FIG. 2, properties that a light of the wavelengths $\lambda 1$ to $\lambda N$ is transmitted and at the same time, a light of the wavelength $\lambda$video, which lies on a side of longer wavelengths of the relevant band, is totally reflected, and here, for example, among input wavelength-multiplexed lights input by wavelength-multiplexing a video signal light of the wavelength $\lambda$video in the downstream direction to be delivered to a plurality of ONUs and a signal light of the wavelengths $\lambda 1$ to $\lambda N$ to be transmitted to individual ONUs by wavelength, the video signal light of the wavelength $\lambda$video is reflected in a direction symmetrical to a normal to a reflecting surface thereof (in the present example, a direction perpendicular to the incidence direction) and signal light of the remaining wavelengths $\lambda 1$ to $\lambda N$ is transmitted.

Also, each reflecting mirror 3-$i$ is arranged in parallel with the video filter 2 at regular intervals on optical paths of the video signal light reflected by the video filter 2. The reflecting mirror 3-1 is constituted as a 1/N reflecting mirror that reflects a portion (1/N) of the video signal light reflected by the video filter 2 in a direction of the reflecting surface of the video filter 2 and transmits remaining light to the reflecting mirror 3-2 in the next stage, and the reflecting mirror 3-2 is constituted as 1/(N−1) reflecting mirror that reflects a further portion (1/(N−1)) of the video signal light that is transmitted through the reflecting mirror 3-1 in the previous stage in the direction of the reflecting surface of the video filter 2 and transmits remaining light to the reflecting mirror 3-$i$ in the next stage. Similarly, each remaining reflecting mirror 3-$i$ has properties that a portion of the video signal light transmitted through the reflecting mirror 3-($i$−1) in the previous stage is reflected toward the reflecting surface of the video filter 2 and remaining light is transmitted to the reflecting mirror 3-($i$+1) in the next stage.

That is, the reflecting mirror 3-$i$ is constituted as a 1/(N−$i$+1) reflecting mirror that reflects 1/(N−$i$+1) of the video signal light reflected by the video filter 2 and transmits remaining light, and this branches off power of the video signal light evenly to cause each video signal light to be incident on a plurality of locations (N portions) of the reflecting surface of the video filter 2 in parallel. Meanwhile, as the reflecting mirror 3-N in the last stage, a simple total reflection mirror may be used.

That is, each reflecting mirror 3-$i$ is provided on a side of the reflecting surface of the video filter 2 and constitutes a first optical system (first reflective optical system) in which a video signal light (reflected light) reflected by the video filter 2 is re-incident on a plurality (N) of incident positions on the reflecting surface of the filter device 2. Then, to cause the video signal light (reflected light) to be incident on each of the incident positions in parallel with the input wavelength-multiplexed light after being reflecting multiple (N) times at spatially different positions on optical paths thereof, for example, each reflecting mirror 3-$i$ is constituted as a reflecting mirror (half mirror) that reflects at least a portion of the reflected light (video signal light) toward the incident position. Meanwhile, these reflecting mirrors 3-$i$ have a length such that optical paths of light of each wavelength $\lambda 1$ to $\lambda N$ reflected by each wavelength filter 4-$i$ are not obstructed.

Next, each wavelength filter 4-$i$ is arranged in parallel with the video filter 2 at regular intervals (the same intervals as arrangement intervals of the reflecting mirror 3-$i$) at least on optical paths of transmitted light on the side of the transmission surface of the video filter 2, and for example, the wavelength filter 4-1 has filter characteristics (See a symbol b in FIG. 2) that, among the transmitted lights (wavelengths $\lambda 1$ to $\lambda N$) of the video filter 2, a light of the wavelength $\lambda 1$ is reflected toward the video filter 2 and a light of remaining wavelengths $\lambda 2$ to $\lambda N$ is transmitted to the wavelength filter 4-2 in the next stage, and the wavelength filter 4-2 has filter characteristics (See a symbol c in FIG. 2) that a light of the wavelength $\lambda 2$ of the transmitted light (wavelengths $\lambda 2$ to $\lambda N$) of the wavelength filter 4-1 is reflected toward the video filter 2 and a light of remaining wavelengths $\lambda 3$ to $\lambda N$ is transmitted to the wavelength filter 4-3 in the next stage.

Similarly, each remaining wavelength filter 4-$i$ has filter characteristics that a light of a specific wavelength of the transmitted light of the wavelength filter 4-($i$−1) in the previous stage is reflected toward the video filter 2 and a light of remaining wavelengths is transmitted to the wavelength filter 4-($i$+1) in the next state. However, the wavelength filter 4-N in the last stage is constituted as a total reflection mirror having properties that a light of the wavelength $\lambda N$ is totally reflected toward the video filter 2.

That is, the wavelength filter 4-L (L=1 to (N−1)) has properties that a light of the wavelength $\lambda L$ of the transmitted light from the video filter 2 is reflected and a light of other remaining wavelengths is transmitted, and this mechanism separates one wavelength at a time from the transmitted light of the video filter 2 using the wavelength filter 4-$i$ at a spatially different location before being reflected toward the video filter 2.

Here, since each wavelength filter 4-$i$ is arranged at the same intervals as arrangement intervals of the reflecting mirror 3-$i$, each light reflected by each wavelength filter 4-$i$ is incident on the video filter 2 from the surface (transmission surface) side opposite to the reflecting surface of the video filter 2 at the same position as the position where a video signal light reflected by each reflecting mirror 3-$i$ is re-incident on the video filter 2 and, as a result, a light obtained by superimposing the video signal light on a light of each wavelength $\lambda 1$ to $\lambda N$ is output as an output light of the wavelength superimposing device 1.

In the example shown in FIG. 1, a sufficient length (shorter with distance from the input port) is set for each wavelength filter 4-$i$ so that optical paths of the transmitted light of the video filter 2 and each wavelength filter 4-L and those of the reflected light of the wavelength filter 4-N in the last stage are traversed, but like each reflecting mirror 3-$i$, each wavelength filter 4-$i$ may be set to the same length as the wavelength filter 4-N.

Also, each of the video filter 2, reflecting mirror 3-$i$, and wavelength filter 4-$i$ can be constructed from a dielectric multilayer formed on a substrate such as a glass substrate, as described later, and the wavelength superimposing device 1 in the present example can be constructed by laminating these substrates on both sides of the video filter 2 with the video filter 2 taking the central position.

By constituting the wavelength superimposing device 1 as described above, a light obtained by wavelength-multiplexing a signal light of the wavelengths $\lambda 1$ to $\lambda N$ and a video signal light of the wavelength $\lambda$video is input into the input port. The video signal light of the wavelength $\lambda$video is reflected by the video filter 2 toward the reflecting mirror 3-$i$ and a wavelength-multiplexed light of the remaining wavelengths $\lambda 1$ to $\lambda N$ is transmitted through the video filter 2.

Then, the video signal light is evenly branched off in power by each reflecting mirror 3-$i$ and each branched video signal light is reflected in parallel toward the video filter 2 so that each reflected light is re-incident on a spatially different location of the reflecting surface of the video filter 2 at regular intervals.

The signal light of the wavelengths $\lambda 1$ to $\lambda N$, on the other hand, is spectrally separated by each wavelength filter 4-$i$ to obtain a light of one wavelength at a time and the light of each separated wavelength is reflected toward the video filter 2 and then incident on the same position as the re-incident position of the video signal light of the video filter 2.

Through this mechanism, at each re-incident position of the video filter 2, the video signal light of the wavelength $\lambda$video is superimposed (multiplexed) on the signal light of individual wavelengths $\lambda 1$ to $\lambda N$ to obtain each light ($\lambda 1+\lambda$video, $\lambda 2+\lambda$video, ..., $\lambda N+\lambda$video), which will be output from a plurality (1 to N) of output locations (output ports) of the wavelength superimposing device 1.

Therefore, while transmitting an input wavelength-multiplexed light by separating the input light into each light of wavelengths $\lambda 1$ to $\lambda N$ addressed to each ONU without requiring a discrete component as before, the video signal light can be superimposed on each light of these wavelengths $\lambda 1$ to $\lambda N$ for delivery (broadcasting) to each ONU.

Also, by constructing each of the video filter 2, reflecting mirror 3-$i$, and wavelength filter 4-$i$ from a dielectric multilayer formed on a substrate such as a glass substrate, when compared with a case in which an optical waveguide technique is used, an optical loss on optical paths of reflected light and transmitted light from the input port to each output port can significantly be reduced, realizing broadcast communication at a low loss.

If a signal light of the wavelengths $\lambda 1$ to $\lambda N$ is input into each output port (for example, each signal light of the wavelengths $\lambda 1$ to $\lambda N$ is input, beginning with the output port to the left of the page sequentially), each such signal light is transmitted through the video filter 2.

Then, the signal light of the wavelength $\lambda 1$ is reflected by the wavelength filter 4-1 before being output to the input port. The signal light of the wavelength $\lambda 2$ is transmitted through the wavelength filter 4-1 to be reflected by the wavelength filter 4-2 before being output to the input port. Similarly, each signal light of other wavelengths $\lambda 3$ to $\lambda N$ is reflected by the wavelength filter 4-$i$ before being output to the output port.

This leads to an output of a light obtained by superimposing (multiplexing) each signal light of the individual wavelengths $\lambda 1$ to $\lambda N$ upon another from the input port of the wavelength superimposing device.

Next, modifications of the wavelength superimposing device in the present embodiment will be described with reference to FIGS. 3 to 5.

[B] Description of a First Modification of the Wavelength Superimposing Device

Figure 3:
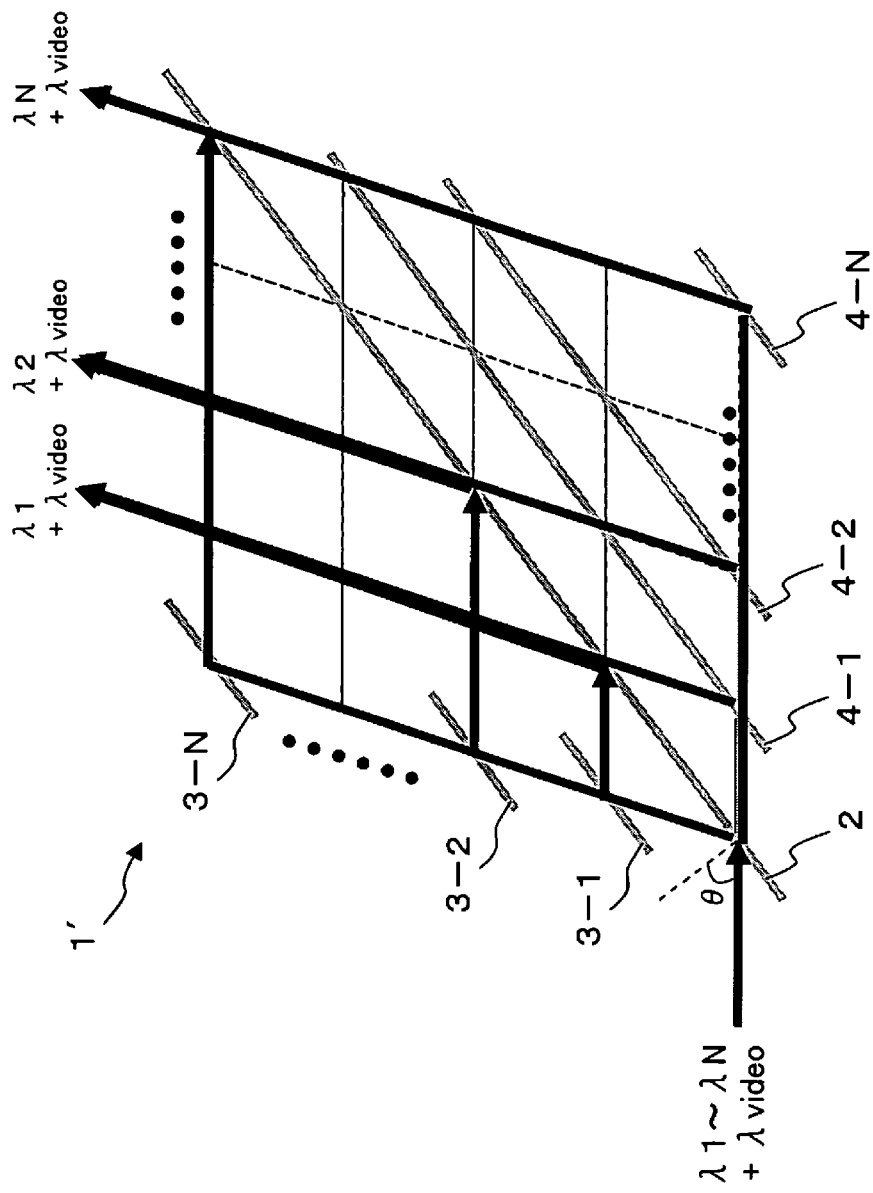
FIG. 3 is a schematic diagram showing a first modification of the wavelength superimposing device shown in FIG. 1 together with optical paths.

In the embodiment described above, an incidence angle $\theta$ of the input wavelength-multiplexed light with the reflecting surface of the video filter 2 is set to 45°, but for example, as shown in FIG. 3, the wavelength superimposing device may have a configuration (wavelength superimposing device 1') in which the incidence angle $\theta$ is changed appropriately in a range of 0°<$\theta$<90°. In FIG. 3, each of components to which the same numeral is attached as described above is the same or a similar component.

Since the same operation effects as those of the wavelength superimposing device 1 are obtained if the incidence angle $\theta$ is set to any angle other than 45°, installation space of the wavelength superimposing device 1' can flexibly be dealt with.

[C] Description of a Second Modification of the Wavelength Superimposing Device

Figure 4:
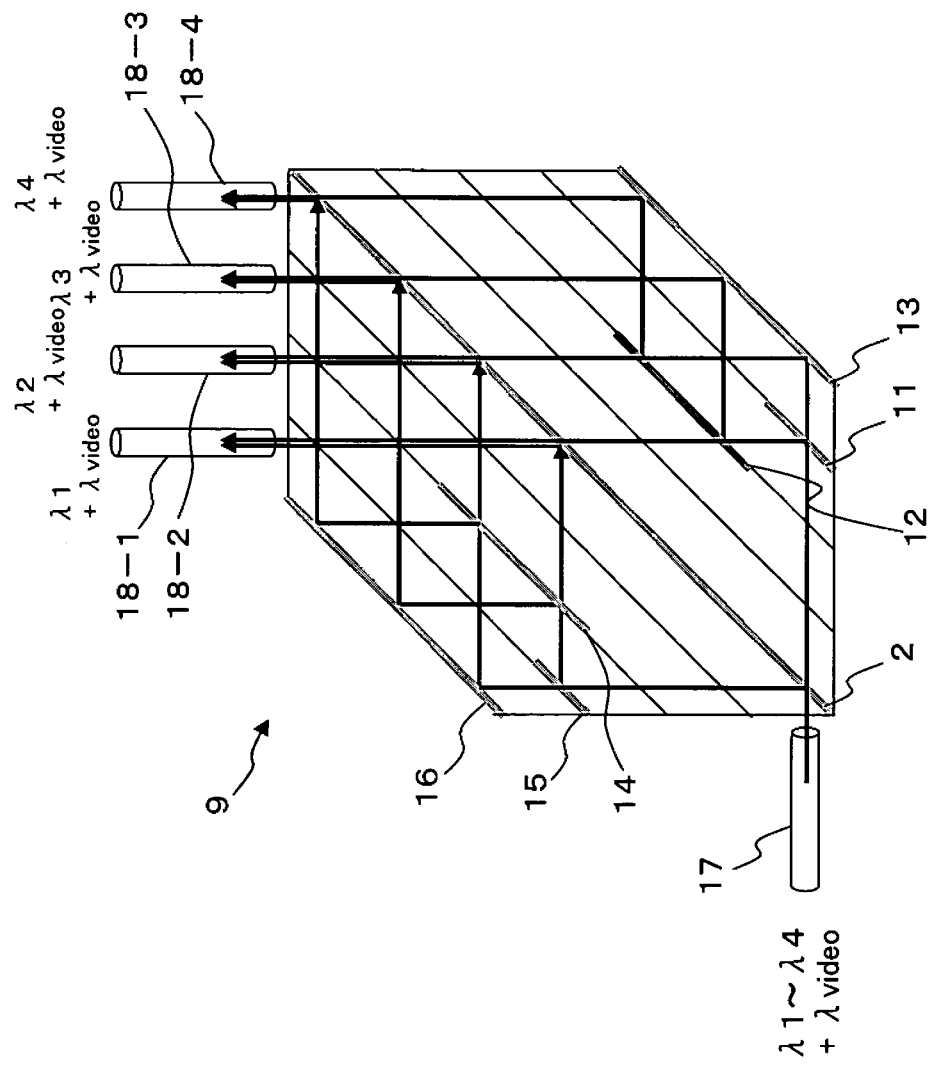
FIG. 4 is a schematic diagram showing a second modification of the wavelength superimposing device shown in FIG. 1 together with optical paths.

FIG. 4 is a schematic diagram showing a second modification of the wavelength superimposing device 1 described above together with optical paths. In comparison with the wavelength superimposing device 1' described with reference to FIG. 1, a wavelength superimposing device 9 shown in FIG. 4 comprises, as the first optical system to cause a video signal light (reflected light) reflected by the video filter 2 to be re-incident on a plurality (N) of locations on the reflecting surface of the video filter 2, half mirrors 14 and 15, and a total reflection mirror 16 instead of the reflecting mirror 3-$i$ and, as the second optical system that separates a transmitted light from the filter device 2 spectrally for each wavelength $\lambda 1$ to $\lambda N$ to cause each separated light to be incident on the plurality of locations from the transmission surface of the filter device 2, wavelength filters 11 and 12 and a reflecting mirror 13 instead of the wavelength filter 4-$i$.

In the present example, however, N=4 is assumed. Also in the configuration shown in FIG. 4, for example, an OLT is connected to the left of the page of the wavelength superimposing device 9, ONUs are connected upward in the page, numeral 17 denotes a fiber collimator (input port) into which a wavelength-multiplexed light in the downstream direction transmitted from the OLT is input, and numerals 18-1 to 18-4 denote fiber collimators (output ports) for outputting light of the wavelengths $\lambda 1$ to $\lambda 4$ to be transmitted to each ONU respectively.

Here, the half mirror 15 is a mirror in the first optical system having properties that an input light is reflected and transmitted in a ratio of 1:1, and is arranged here with a sufficient length in a third layer when first to fourth layers placed at equal intervals in parallel with the video filter 2 are considered in turn from the video filter 2 so that, after receiving at least a video signal light of the wavelength $\lambda$video reflected by the video filter 2 as the input light, the video signal light (reflected light by the video filter 2) is reflected in the ratio of 1:1 in the direction of the video filter 2 and transmitted in the direction of the total reflection mirror 16.

Also, the half mirror 14 is a mirror having properties that an input light is reflected and transmitted in the ratio of 1:1, and is arranged here with a sufficient length in a second layer, which lies inside the third layer, so that, after receiving a video signal light reflected by the half mirror 15 and the total reflection mirror 16 as an input light at spatially different locations respectively, each video signal light is reflected in parallel in the direction of different locations of the total reflection mirror 16 and also transmitted in the direction of the video filter 2.

Then, the total reflection mirror 16 is a mirror having properties that an input light is totally reflected, and is arranged here with a sufficient length in the fourth layer, which lies further outside the third layer, so that a transmitted light of the half mirror 15 and all reflected lights of the half mirror 14 can be received as the input light.

By constituting the first optical system as described above, a video signal light reflected by the video filter 2 will be re-incident at equal intervals in parallel on a plurality (4) of locations on the reflecting surface of the video filter 2 as a transmitted light of the half mirror 14 and a reflected light of the total reflection mirror 16 respectively, realizing functions equivalent to those of the first optical system described with reference to FIG. 1.

Figure 5:
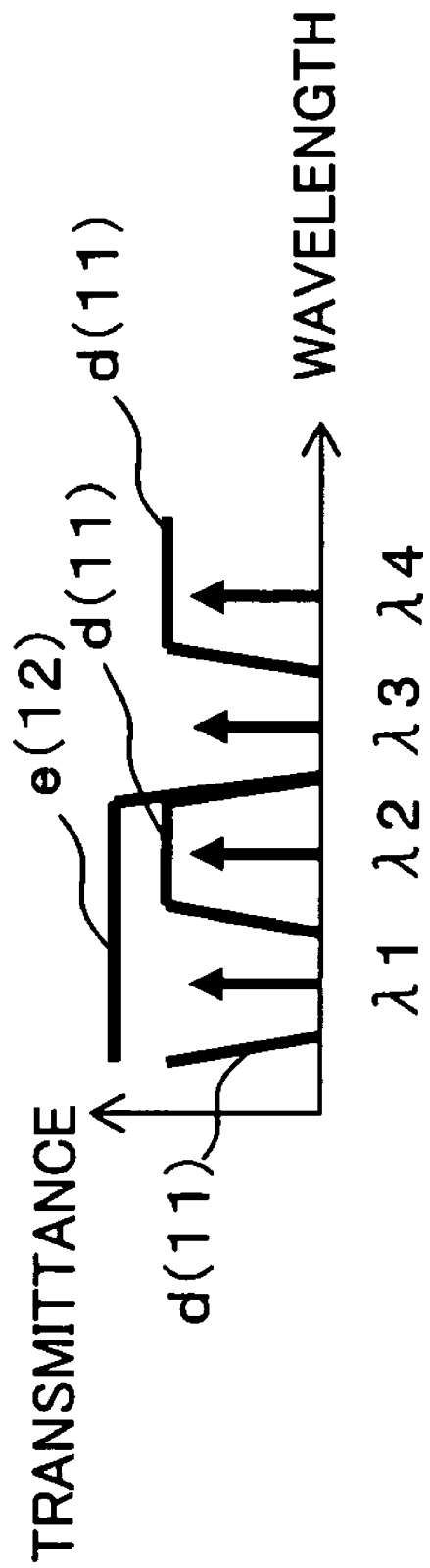
FIG. 5 is a diagram showing the filter characteristic of a wavelength filter shown in FIG. 4.

In the second optical system, on the other hand, the wavelength filter 11 has, as shown, for example, by a symbol d in FIG. 5, a periodic filter characteristic that, among the wavelengths $\lambda 1$ to $\lambda 4$, each light of the wavelengths $\lambda 1$ and $\lambda 3$ is reflected and each light of the wavelengths λ2 and λ4 is transmitted, and is arranged here with a sufficient length, like the first optical system, in the third layer when first to fourth layers placed at equal intervals in parallel with the video filter 2 are considered in turn from the video filter 2 so that a transmitted light (wavelength-multiplexed light of the wavelengths λ1 to λ4) of the video filter 2 can be received as an input light. Therefore, the light of the wavelengths λ1 and λ3 will be reflected toward the video filter 2 and the light of the remaining wavelengths λ2 and λ4 will be transmitted in the direction of the total reflection mirror 13.

The wavelength filter 12 has, as shown, for example, by a symbol e in FIG. 5, a filter characteristic that, among the wavelengths λ1 to λ4, each light of the wavelengths λ1 and λ2 is transmitted and each light of the wavelengths λ3 and λ4 is reflected, and is arranged here with a sufficient length in the second layer, which lies closer to the video filter 2 than the third layer where the wavelength filter 11 is provided, so that a reflected light (a light of the wavelength λ1 or λ3) of the wavelength filter 11 and a light (a light of the wavelength λ2 or λ4) that is transmitted through the wavelength filter 11 and reflected by the total reflection mirror 13 can be received as an input light respectively.

Therefore, among lights of the wavelengths λ1 and λ3 reflected by the wavelength filter 11, the light of the wavelength λ1 will be transmitted through the wavelength filter 12 to be incident on the video filter 2 and the light of the wavelength λ3 will be reflected toward the total reflection mirror 13. Similarly, among lights (lights of the wavelengths λ2 and λ4) transmitted through the wavelength filter 11 and reflected by the total reflection mirror 13, the light of the wavelength λ2 will be transmitted through the wavelength filter 12 to be incident on the video filter 2 and the light of the wavelength λ4 will be reflected by the wavelength filter 12 toward the total reflection mirror 13.

The total reflection mirror 13 is a mirror having properties that all input light is reflected and, in the present example, is arranged with a sufficient length in the fourth layer, which lies farther away from the video filter 2 than the third layer where the wavelength filter 11 is provided, so that the transmitted light of the wavelength filter 11 and each of the reflected light of the wavelength filter 12 can be received as an input light respectively. Therefore, it becomes possible for a transmitted light (light of the wavelengths λ2 and λ4) from the wavelength filter 11 to be incident on the wavelength filter 12 after being reflected, for a light (light of the wavelength λ3) reflected by the wavelength filters 11 and 12 to be incident on the wavelength filter 12 after further being reflected, and for a light (light of the wavelength λ4) transmitted through the wavelength filter 11 and reflected by the total reflection mirror 13 and wavelength filter 12 to be incident on the video filter 2 after further being reflected.

By constituting the second optical system as described above, a wavelength-multiplexed light of the wavelengths λ1 to λ4 transmitted through the video filter 2 is separated, as shown in FIG. 4, into each light of the wavelengths λ1 to λ4 by a combination of the wavelength filters 11 and 12 and the total reflection mirror 13 to be incident on the same re-incident position as each re-incident position of a video signal light to the video filter 2 in the first optical system, realizing functions equivalent to those of the second optical system described with reference to FIG. 1.

Therefore, also in the wavelength superimposing device 9 in the present example, like the embodiment described above, if a wavelength-multiplexed light of the wavelengths λ1 to λ4 and the wavelength λvideo is input into the input port 17, a video signal light of the wavelength λvideo is reflected by the video filter 2 to be branched off in four directions by the combination of the half mirrors 14 and 15 and the total reflection mirror 16 at spatially different locations before being re-incident on different locations of the video filter 2 in parallel. A light of the wavelengths λ1 to λ4 transmitted through the video filter 2, on the other hand, is separated into each light of individual wavelengths by the combination of the wavelength filters 11 and 12 and the total reflection mirror 13 at spatially different locations before being incident on the same position as each re-incident position of the video signal light from a surface (transmission surface) side opposite to the reflecting surface of the video filter 2.

This leads to an output of lights obtained by superimposing a video signal light of the wavelength λvideo upon each light of the wavelengths λ1 to λ4 from the output ports 18-1 to 18-4 of the wavelength superimposing device 9 as output lights.

According to the wavelength superimposing device 9 in the present modification, as described above, in addition to providing operation effects equivalent to those of the wavelength superimposing device 1, the number of mirrors can be reduced by ingeniously designing reflection positions and transmission positions of a video signal light (light of the wavelength λvideo) in the first optical system and the number (types) of wavelength filters needed for the second optical system can be reduced by ingeniously designing reflection positions and transmission positions of a light of each wavelength λ1 to λN and wavelength filter characteristics in the second optical system. Thus, a cost of the wavelength superimposing device 9 equipped with functions equivalent to those of the above-described wavelength superimposing device 1 can further be reduced.

Also for the wavelength superimposing device 9, the incidence angle with the reflecting surface of the filter device 2 of an input wavelength-multiplexed light from the input port 17 is set to 45°, but like the above-described first modification (wavelength superimposing device 1'), any incidence angle other than 45° may also be set.

The configuration of the first optical system and that of the second optical system are not limited to those described above. That is, it is sufficient for the first optical system to have a configuration in which a video signal light reflected by the video filter 2 can be branched off in as many directions as the number of output ports to cause each branched video signal light to be re-incident on a spatially different location with respect to the reflecting surface of the video filter 2 and for the second optical system to have a configuration in which a light transmitted through the video filter 2 can be spectrally separated for each wavelength to cause each separated light to be incident on each re-incident position to the video filter 2 of the video signal light.

[D] Description of the Method of Manufacturing Wavelength Superimposing Devices

Next, the method of manufacturing the wavelength superimposing device 1 described with reference to FIG. 1 will be described using FIGS. 6 and 7. However, to simplify a description below, a method of manufacturing the wavelength superimposing device 1 when N=4, that is, a video signal light of the wavelength λvideo can be superimposed on each signal light of the wavelengths λ1 to λ4 will be described.

(1) Vapor Deposition of a Dielectric Multilayer (First Process)

Figure 6:
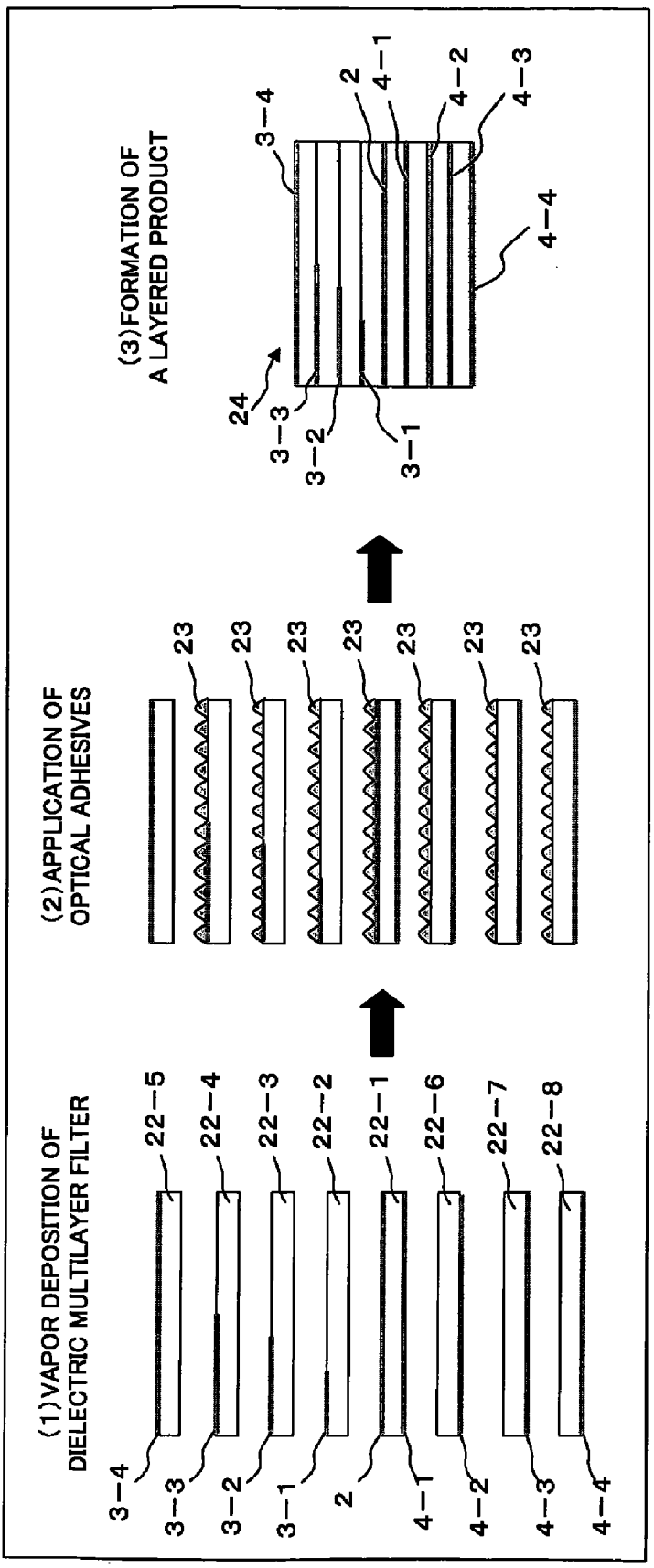
FIG. 6 is a schematic diagram illustrating a method of manufacturing the wavelength superimposing device shown in FIG. 1.

First, for example, eight glass substrates 22-1 to 22-8 with the same thickness are prepared, as shown in (1) of FIG. 6, a video filter (first dielectric multilayer) 2 that reflects a video signal light of the wavelength λvideo, which is a light of a portion of wavelengths of an input wavelength-multiplexed light, and transmits a light of remaining wavelengths λ1 to λ4 is formed (evaporated) by a dielectric multilayer on one surface of any glass substrate (first substrate) 22-1, and a wavelength filter 4-1 having properties that a light of the wavelength λ1 is reflected and a light of other wavelengths λ2 to λ4 is transmitted is formed by a dielectric multilayer on the other surface.

In addition, a reflecting mirrors (second dielectric multilayer) 3-1 to 3-3 having properties that a portion (¼) of a video signal light of the wavelength λvideo is reflected and the rest (¾) is transmitted are formed by a dielectric multilayer in a portion of one surface of three glass substrates (second multiple substrates) 22-2 to 22-4 respectively. However, as described above, each of these reflecting mirrors 3-1 to 3-3 is formed into a length such that optical paths of each of the wavelengths λ1 to λN reflected by each wavelength filter 4-i are not obstructed. Also, a reflecting mirror (total reflection mirror) 3-4 having properties that a video signal light is totally reflected is formed by a dielectric multilayer on one surface of another glass substrate 22-5.

Also, the wavelength filters (third dielectric multilayer) 4-2 and 4-3 having properties that a light of the wavelength λ2 and λ3 is reflected and a light of other wavelengths is transmitted respectively is formed by a dielectric multilayer on one surface of other glass substrates (third multiple substrates) 22-6 and 22-7, and further a wavelength filter (total reflection mirror) 4-4 having properties that a light of the wavelength λ4 is reflected is formed by a dielectric multilayer on one surface of another glass substrate 22-8.

Meanwhile, a dielectric multilayer for each of the above glass substrates 22-1 to 22-8 may be formed in any order.

(2) Application of Optical Adhesives

Next, as shown in (2) of FIG. 6, for example, optical adhesives 23 such as ultraviolet curing adhesives are applied to at least one surface of the glass substrates 22-1 to 22-8 on which a dielectric multilayer was formed in the first process respectively.

(3) Formation of a Layered Product (Second Process)

Then, as shown in (3) of FIG. 6, each of the glass substrates 22-1 to 22-8 is laminated and pasted, with the glass substrate 22-1 on which the video filter 2 (wavelength filter 4-1) is formed taking the central position, on both sides thereof in the order shown in (1) of FIG. 6 to form a layered product 24.

(4) Clipping and Optical Polishing (Third Process)

Figure 7:
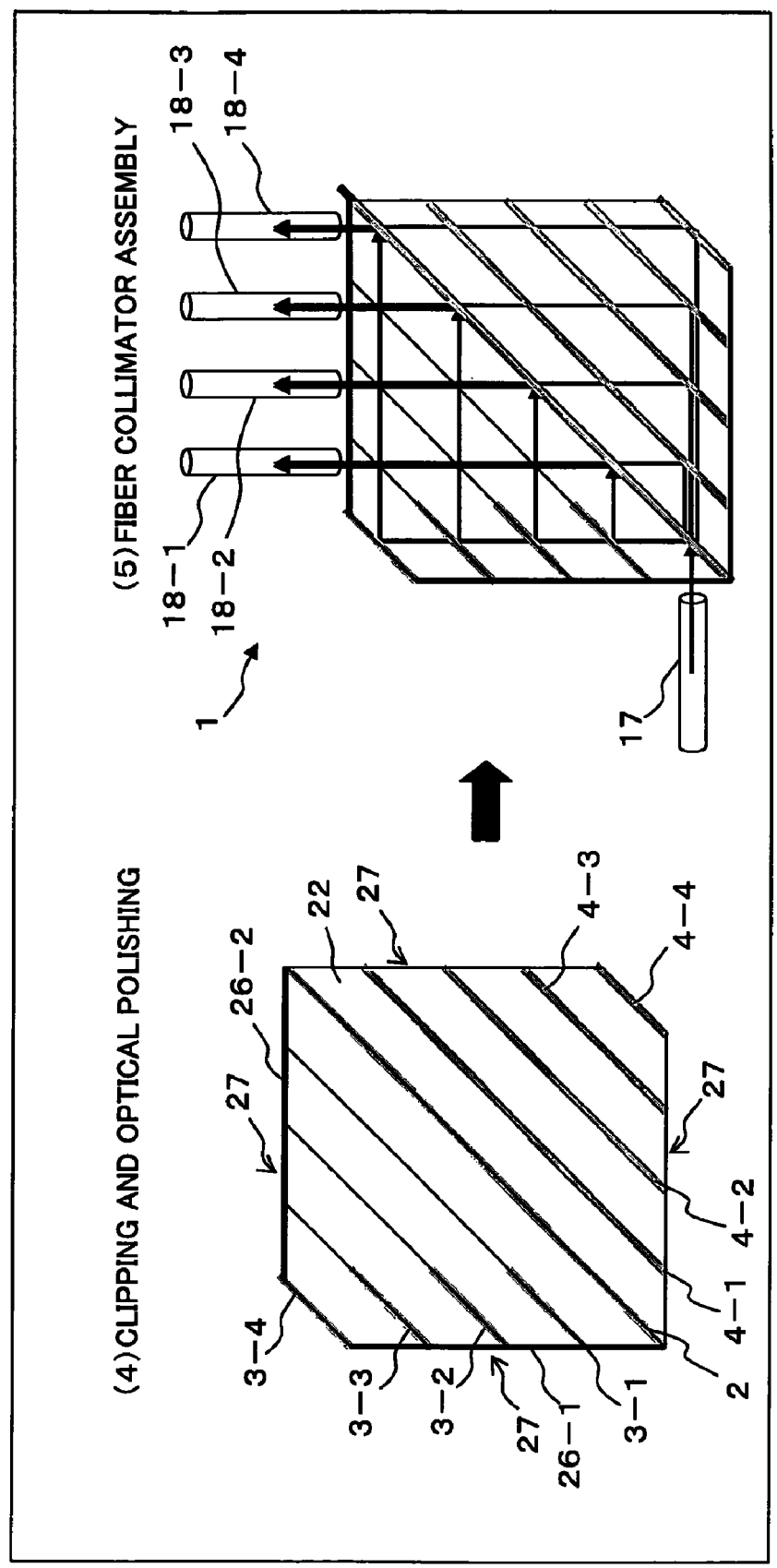
FIG. 7 is a schematic diagram illustrating a method of manufacturing the wavelength superimposing device shown in FIG. 1.

Then, as shown in (4) of FIG. 7, the layered product 24 is cut by a clipping surface 27 to cut off unnecessary parts so that an orthogonal plane is formed at an angle of 45° with layers of the video filter 2 on both sides of layers of the video filter 2 respectively and an optical polishing to prevent scattering of light is provided to a surface 26-1, which becomes an incidence plane of the light to the video filter 2, and a surface 26-2, which is orthogonal to the incidence plane and becomes an emission plane of light.

That is, the layered product 24 is formed by cutting off unnecessary parts from the layered product 24 formed in the second process by the clipping surface 27 so that the glass substrates 22-2 to 22-5 and the reflecting mirrors 3-1 to 3-4 constitute the first optical system in which a video signal light (reflected light) of the wavelength λvideo reflected by the video filter 2 is re-incident on a plurality (four) of incident positions of the video filter 2 and the glass substrates 22-1, and 22-6 to 22-8 and the wavelength filters 4-1 to 4-4 constitute the second optical system in which a light (transmitted light) of the wavelengths λ1 to λ4 transmitted through the video filter 2 is spectrally separated for each wavelength and each separated light is incident on the plurality (four) of incident positions from the transmission surface of the video filter 2.

(5) Fiber Collimator Assembly

Lastly, as shown in (5) of FIG. 7, a fiber collimator 17, which becomes the input port for the incidence plane 26-1, is arranged and fiber collimators 18-1 to 18-4, which become output ports for the emission plane 26-2, are arranged.

The wavelength superimposing device 1 in the present embodiment can be manufactured by the above-described processes of (1) to (5). That is, since the wavelength superimposing device 1 can be manufactured by a simple process in which dielectric multilayers with desired reflection or transmission properties and wavelength filter characteristics are formed on a plurality of glass substrates 22, the layered product 24 is formed by laminating these glass substrates 22 in a predetermined order, unnecessary parts are cut off from the layered product 24 so that the first and second optical systems are constructed, and an optical polishing is provided to the surfaces 26-1 and 26-2, which become the incidence plane and the emission plane respectively, it becomes possible to reduce the number of man-hours and costs of the present device 1.

Meanwhile, if, for example, the thickness of each of the glass substrates 22-1 to 22-8 is 2 mm and the number of wavelengths of an input wavelength-multiplexed light is N=4, the length l of one side of the wavelength superimposing device 1 becomes l=2 mm×(4+1)×√2≈14 mm, enabling realization of the wavelength superimposing device 1 in a very compact form. Since the length of the wavelength superimposing device 1 in a depth direction of the page is determined by the length of the glass substrates 22-1 to 22-8 in the depth direction of the page, the length should be designed to be longer to increase strength of the wavelength superimposing device 1 and the length should be designed to be shorter to make the wavelength superimposing device 1 more compact (thin). Generally, the strength and size of the wavelength superimposing device 1 is designed such that required reliability can be guaranteed.

Moreover, if each of the wavelength filters 4-1 to 4-4 is formed (evaporated) to have a necessary and sufficient length to constitute the second optical system in the first process, further cost reduction is possible.

Also, the wavelength superimposing devices 1' and 9 can basically be manufactured in processes similar to those described above.

[E] Description of a WDM-PON System (WDM Network System) Using a Wavelength Superimposing Device Next, a WDM-PON system (WDM network system) using the wavelength superimposing devices 1 (or the wavelength superimposing devices 1' or 9; this applies also below if not specifically mentioned) in the embodiment will be described using FIG. 8.

Figure 8:
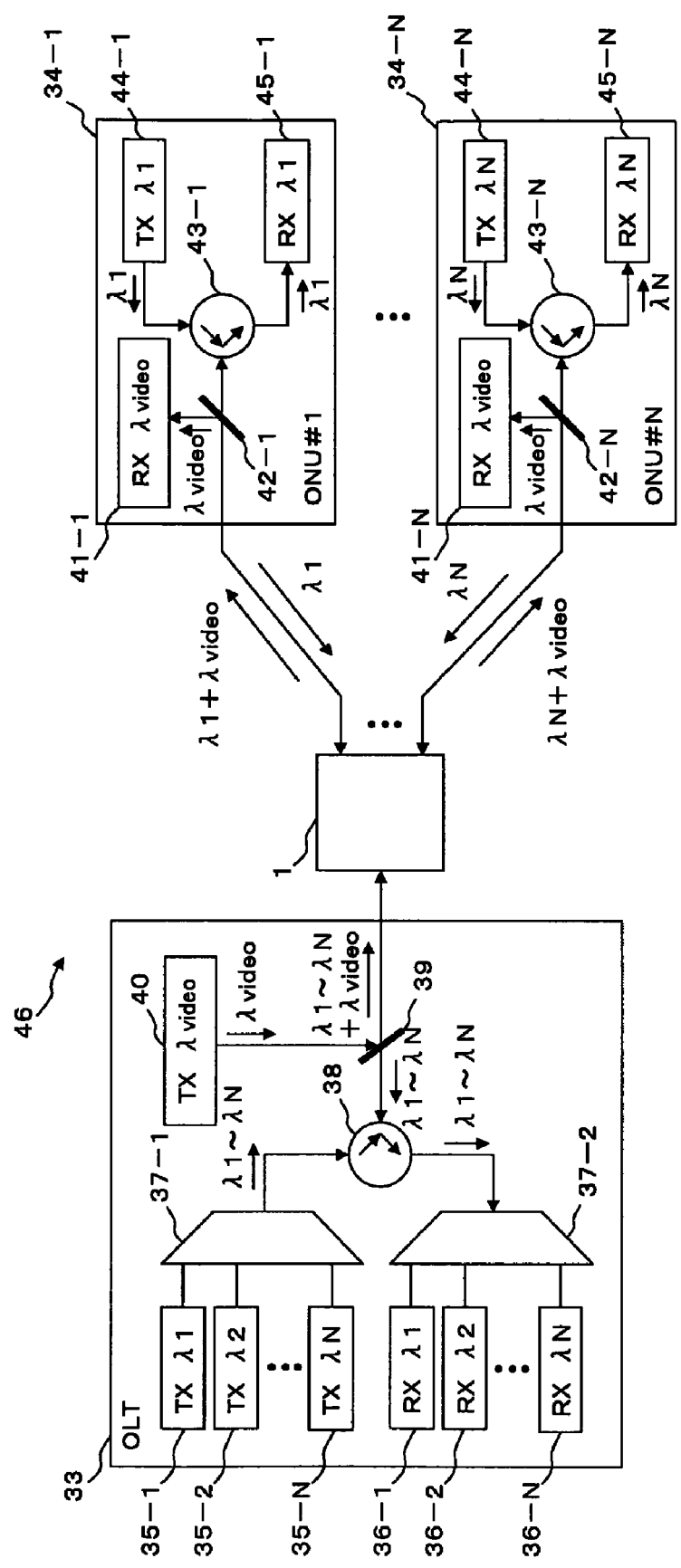
FIG. 8 is a block diagram showing the configuration of a main portion of a WDM-PON system (WDM network system) using the wavelength superimposing device according to the embodiment of the present invention.

A WDM-PON 46 shown in FIG. 8 comprises a plurality of ONU 34-1 to 34-N, an OLT 33 for transmitting a light of a plurality of wavelengths (λ1 to λN, and λvideo) to be transmitted to the plurality of ONU 34-1 to 34-N after wavelength-multiplexing, and the wavelength superimposing device 1 that receives a wavelength-multiplexed light from the OLT 33 and transmits the light to each ONU 34-1 to 34-N.

The ONU 33 comprises transmitters (TX) 35-1 to 35-N, receivers (RX) 36-1 to 36-N, WDM couplers 37-1 and 37-2, an optical circulator 38, a video signal light transmitter (TX λvideo) 40, and wavelength filter 39.

Here, the transmitter 35-i (i=1 to N) is used to generate a signal light of a downstream direction wavelength (also referred to as a downstream wavelength below) λi addressed to the ONU 34 to send out the signal light to the WDM coupler 37-1 and the receiver 36-i is used to receive a signal light of an upstream direction wavelength (also referred to as an upstream wavelength below) from the ONU 34 branched off in the WDM coupler 37-2 to perform predetermined reception processing.

The WDM coupler 37-1 is used to multiplex a signal light of the wavelength $\lambda i$ from the transmitter 35-*i* to send out the multiplexed signal light to the optical circulator 38 and the WDM coupler 37-2 is used to separate a wavelength-multiplexed light from the optical circulator 38 into lights of each wavelength $\lambda 1$ to $\lambda N$ to output a light of the wavelength $\lambda i$ to the corresponding receiver 36-*i*.

The optical circulator 38 is used to send out a downstream wavelength-multiplexed light from the WDM coupler 37-1 to the wavelength superimposing device 1 and to send out an upstream wavelength-multiplexed light from wavelength superimposing device 1 to the WDM coupler 37-2. That is, the optical circulator 38 functions as a separation means for separating upstream direction signal lights from downstream direction signal lights.

Further, the video signal light transmitter 40 is used to generate a video signal light of the wavelength $\lambda$video to be broadcasted to the ONU 34 to send out the video signal light to the wavelength filter 39.

The wavelength filter 39 is used to superimpose (multiplex) a video signal light from the video signal light transmitter 40 on a wavelength-multiplexed light of the wavelengths $\lambda 1$ to $\lambda N$ from the optical circulator 38 and has, for example, filter characteristics that a video signal light of the wavelength $\lambda$video is reflected and a light of the wavelengths $\lambda 1$ to $\lambda N$ is transmitted.

Each of the ONU 34-*i*, on the other hand, has the same configuration, as shown in FIG. 8, and comprises a wavelength filter 42-*i*, a video signal light receiver (RX $\lambda$video) 41-*i*, an optical circulator 43-*i*, a transmitter 44-*i*, and a receiver 45-*i*.

Here, the wavelength filter 42-*i* has filter characteristics that, among wavelength-multiplexed lights obtained by wavelength-multiplexing a signal light of the downstream direction wavelength $\lambda i$ from the wavelength superimposing device 1 and a video signal light of the wavelength $\lambda$video, the video signal light of the wavelength $\lambda$video is reflected and sent out to the video signal light receiver 41-*i* and also the light of the wavelength $\lambda i$ is transmitted and sent out to the optical circulator 43-*i*.

The video signal light receiver 41-*i* is used to receive a video signal light from the wavelength filter 42-*i* to perform predetermined reception processing.

Further, the optical circulator 43-*i* is used to send out a signal light of the downstream wavelength $\lambda i$ from the wavelength filter 42-*i* to the receiver 45-*i* and also to send out a signal light of the upstream wavelength $\lambda i$ from the transmitter 44-*i* to the wavelength filter 42-*i*. That is, the optical circulator 43 also functions as a separation means for separating upstream direction signal lights from downstream direction signal lights.

The transmitter 44-*i* is used to generate a signal light of the upstream wavelength $\lambda i$ to send it out to the optical circulator 43-*i*, and the receiver 45-*i* is used to receive a signal light of the downstream wavelength $\lambda i$ from the optical circulator 43-*i* to perform predetermined reception processing.

Operations of the WDM-PON system 46 constituted as described above will be described below. In the downstream direction, a signal light of the downstream wavelengths $\lambda 1$ to $\lambda N$ generated by each transmitter 35-*i* of the OLT 33 is multiplexed by the WDM coupler 37-1 before being input into the wavelength filter 39 as a wavelength-multiplexed light via the optical circulator 38. A wavelength-multiplexed light of the wavelengths $\lambda 1$ to $\lambda N$ is transmitted and a video signal light of the wavelength $\lambda$video generated by the video signal light transmitter 40 is reflected by the wavelength filter 39 to superimpose (wavelength-multiplex) the video signal light on the wavelength-multiplexed light of the wavelengths $\lambda 1$ to $\lambda N$ and the wavelength-multiplexed light is sent out to the wavelength superimposing device 1.

In the wavelength superimposing device 1, among input wavelength-multiplexed lights obtained by wavelength-multiplexing a signal light of the wavelengths $\lambda 1$ to $\lambda N$ and a video signal light of the wavelengths $\lambda$video as described above, a signal light of the wavelength $\lambda i$ is sent out to the corresponding ONU 34-*i* together with the video signal light of the wavelengths $\lambda$video (after wavelength-multiplexing).

Then, in the ONU 34-*i*, a wavelength-multiplexed light (wavelengths $\lambda i+\lambda$video) from the wavelength superimposing device 1 is input into the wavelength filter 42-*i*. A signal light of the wavelength $\lambda i$ is transmitted to the optical circulator 43-*i* and a video signal light of the wavelength $\lambda$video is reflected to be input in to the video signal light receiver 41-*i* before performing predetermined reception processing.

The signal light of the wavelength $\lambda i$ is output to the receiver 45-*i* by the optical circulator 43-*i* and then predetermined reception processing is performed by the receiver 45-*i*.

In the upstream direction, on the other hand, an upstream signal light of the wavelength $\lambda i$ generated by the transmitter 44-*i* in the ONU 34-*i* is sent out to the wavelength superimposing device 1 via the optical circulator 43 and wavelength filter 42.

In the wavelength superimposing device 1, lights of the wavelengths $\lambda 1$ to $\lambda N$ are input into the output ports as described above, and each light is transmitted through the video filter 2 to be incident on the wavelength filter 4-*i* before being reflected by the wavelength filter 4-*i* in the direction of the input port for transmission to the OLT 33. That is, in the present example, the upstream direction signal light is a light of the same wavelength as one of the lights of the wavelengths $\lambda 1$ to $\lambda N$ transmitted through the video filter 2 of the wavelength superimposing device 1.

In the OLT 33, a light transmitted from the wavelength superimposing device 1 is transmitted through the wavelength filter 39 and input into the WDM coupler 37-2 by the optical circulator 38. The WDM coupler 37-2 separates an input light spectrally for each wavelength $\lambda i$ and causes the pre-assigned receiver 36-*i* corresponding to a light of the wavelength $\lambda i$ to receive the light.

As has been described above, according to the WDM-PON system 46 in the present example, a video signal light of the wavelength $\lambda$video can be superimposed on each signal light of the downstream wavelengths $\lambda 1$ to $\lambda N$ addressed to each ONU 34-*i* for transmission in the downstream direction by the wavelength superimposing device 1 and thus, delivery (broadcasting) of a video signal light to each ONU 34-*i* can be realized without requiring a discrete component.

Since the wavelength superimposing device 1 is reversible regarding a light of the wavelengths $\lambda 1$ to $\lambda N$ as described above, a light of each wavelength $\lambda 1$ to $\lambda N$ can correctly be transmitted to the OLT 33 also in the upstream direction without modifying the configuration itself of the wavelength superimposing device 1. Therefore, a bidirectional WDM-PON system in which, while delivering (broadcasting) a light of the same wavelength $\lambda$video to a plurality of ONU 34-*i*, optical communication in the opposite direction can also be performed can be realized easily at a low cost.

[F] Description of a First Modification of the WDM-PON System

In the embodiment described above, it is assumed that in order to broadcast a video signal light of the wavelength λvideo to each ONU, a light of the wavelength λvideo is wavelength-multiplexed on the wavelengths λ1 to λN to be input into the wavelength superimposing device 1, but the wavelength superimposing device 1 can also be applied to systems that need not broadcast a light of a specific wavelength to each ONU. In the present modification, an example thereof will be described.

Figure 11:
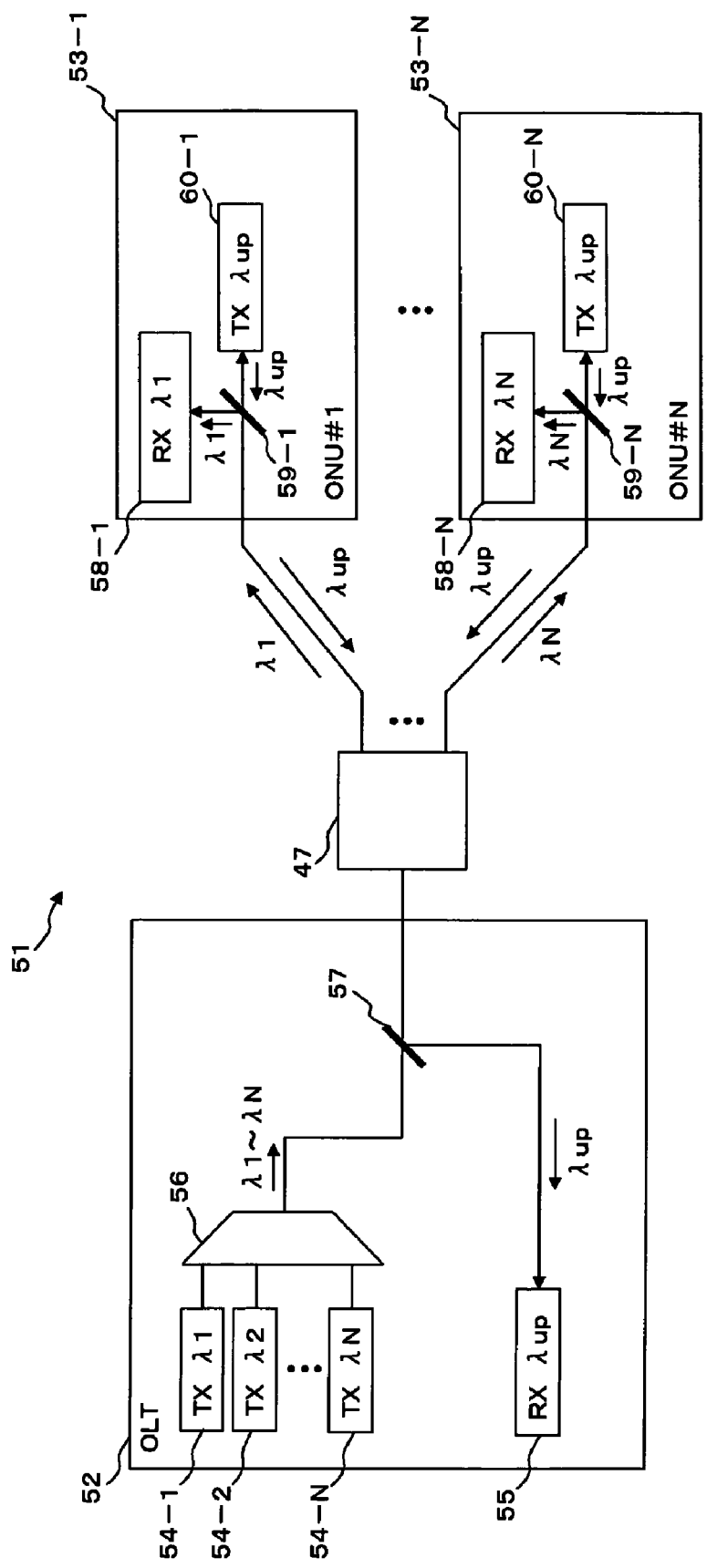
FIG. 11 is a block diagram showing the configuration of the main portion of a WDM-PON system using the wavelength superimposing device shown in FIG. 9.

FIG. 11 is a block diagram showing a first modification of the WDM-PON system described with reference to FIG. 8. A WDM-PON system 51 shown in FIG. 11 comprises a plurality of ONU 53-1 to 53-N, an OLT 52 for transmitting a light of a plurality of wavelengths (λ1 to λN) to be transmitted to the plurality of ONU 53-1 to 53-N after wavelength-multiplexing, and a wavelength superimposing device 47 that, while receiving a downstream signal light (wavelength-multiplexed light) from the OLT 52 to transmit the downstream signal light to each ONU 53-1 to 53-N, receives an upstream signal light from each ONU 53-1 to 53-N to transmit the upstream signal light to the OLT 52.

Then, it is assumed in the present example that wavelengths λ1 to λN are used for transmission of downstream signal light from the OLT 52 to the ONU 53-1 to 53-N, and the same wavelength λup (it is assumed, for example, that λup<λ1 to λN) other than the wavelengths λ1 to λN is used in any case for transmission of upstream signal light from each ONU 53-$i$ to the OLT 52.

Accordingly, the OLT 52 in the present example comprises, for example, transmitters (TX) 54-1 to 54-N by wavelength λ$i$, a receiver 55 for an upstream wavelength λup, a WDM coupler 56, and a wavelength filter 57. Each ONU 53-$i$ comprises, for example, a wavelength filter 59-$i$, a receiver 58-$i$ for a down stream wavelength λ$i$, and a transmitter 60-$i$ for the upstream wavelength λup. The wavelength superimposing device 47 is constituted such that when a light of the upstream wavelength λup is input into the output port, the light of the upstream wavelength λup is transmitted to the input port.

Figure 9:
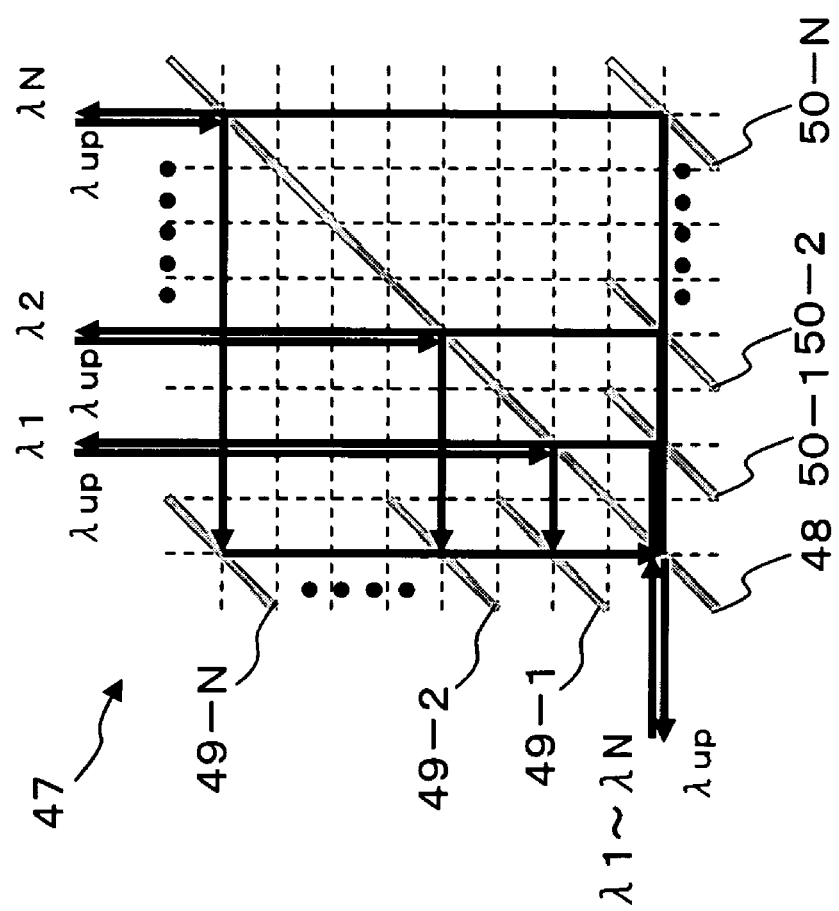
FIG. 9 is a schematic diagram showing the configuration of a wavelength superimposing device used in the first modification of the WDM-PON system according to the present embodiment together with optical paths.

That is, the wavelength superimposing device 47 in the present modification basically has, as shown in FIG. 9 for example, a physical structure similar to the structure described with reference to FIG. 1, and comprises a wavelength filter (filter device) 48, reflecting mirrors (reflector elements) 49-1 to 49-N, and wavelength filters (filter elements) 50-1 to 50-N. Physical relationships of these components are the same as those shown in FIG. 1.

Figure 10:
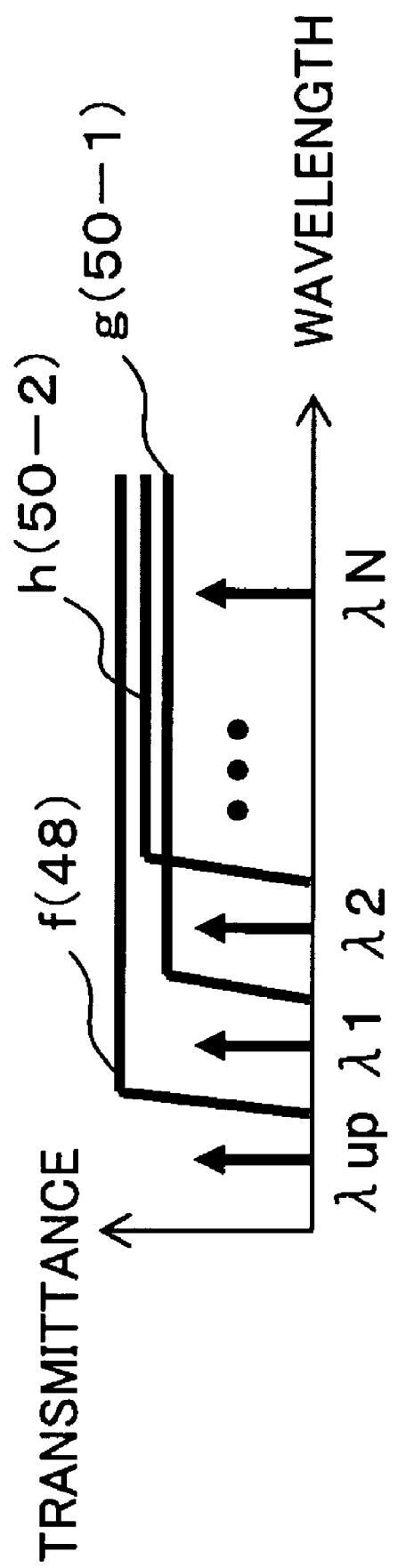
FIG. 10 is a diagram showing the filter characteristic of a wavelength filter shown in FIG. 9.

Here, the wavelength filter 48 has, as shown, for example, by a symbol f in FIG. 10, wavelength filter characteristics that a light of the upstream wavelength λup is reflected and a light of the downstream wavelengths λ1 to λN is transmitted, whereby transmitting a wavelength-multiplexed light of the downstream wavelengths λ1 to λN input from the OLT 52 via the input port as a light to be transmitted to the individual ONU 53-$i$ by wavelength λ$i$, and conversely, reflecting a signal light of the upstream wavelength λup input from the ONU 53-$i$ via the output port toward the reflecting mirror 49-$i$ in the opposite direction of the light of the downstream wavelength λ$i$.

Each reflecting mirror 49-$i$ has a property as a total reflection mirror to reflect a light of the upstream wavelength λup and is used to reflect a light of the upstream wavelength λup reflected by the wavelength filter 48 in the opposite direction of a light of the downstream wavelength λ$i$ toward an incident position of a wavelength-multiplexed light (down stream wavelengths λ1 to λN) from the OLT 52 on the wavelength filter 48, and the light of the upstream wavelength λup incident on the incident position is thereby reflected again by the wavelength filter 2 before being transmitted to the OLT 52 via the input port.

Then, each wavelength filter 50-$i$ excluding the wavelength filter 50-N has, as shown, for example, by symbols h and g in FIG. 10, has filter characteristics that a light of the wavelength λ$i$ is reflected and a light of any wavelength longer than the wavelength λ$i$ is transmitted, and the wavelength filter 50-N has a property as a total reflection mirror to totally reflect a light of the wavelength λN.

Therefore, a light of the downstream wavelength λ$i$ input from the input port is reflected by the wavelength filter 50-$i$ toward the wavelength filter 48 and, after being transmitted through the wavelength filter 48, is transmitted to the ONU 53-$i$ via the corresponding output port. Conversely, a light of the upstream wavelength λup input into the output port from the ONU 53-$i$ is incident on the wavelength filter 48 in a direction opposite to a transmission direction of the downstream wavelength λ$i$, is reflected by the wavelength filter 48 before being incident on the reflecting mirror 49-$i$, is further reflected by the reflecting mirror 49-$i$ before being re-incident on the incident position of the downstream wavelength λ$i$ on the wavelength filter 48, and is finally reflected by the wavelength filter 48 again before being transmitted to the OLT 52 via the input port.

In the OLT 52, each transmitter 54-$i$ is used to generate a signal light of the wavelength λ$i$ addressed to the ONU 53-$i$ to send it out to the WDM coupler 56 and the receiver 55 is used to receive a signal light of the upstream wavelength λup from the ONU 53-$i$ to perform predetermined reception processing.

The wavelength filter 57 has filter characteristics that a light of the downstream wavelengths λ1 to λN is transmitted and a light of the upstream wavelength λup is reflected, and by being arranged on an output side of the WDM coupler 56, as shown in FIG. 11, a light of the downstream wavelength λ$i$ from the WDM coupler 56 is transmitted to the wavelength superimposing device 47 and a light of the upstream wavelength λup from the wavelength superimposing device 47 is reflected toward the receiver 55. That is, the wavelength filter 57 functions as a separation means for separating upstream direction signal lights from downstream direction signal lights.

In the ONU 53-$i$, on the other hand, the wavelength filter 59-$i$ has filter characteristics that a light of the wavelengths λ1 to λN is reflected and a light of the wavelength λup is transmitted, and by being arranged on the output side of the transmitter 60-$i$, as shown in FIG. 11, a signal light of the downstream wavelength λ$i$ from the wavelength superimposing device 47 is reflected toward the receiver 58-$i$ and a light of the upstream wavelength λup from the transmitter 60-$i$ is transmitted to the wavelength superimposing device 47. That is, the wavelength filter 59 functions as a separation means for separating upstream signal lights from downstream signal lights.

Each receiver 58-$i$ is used to receive a signal light of the wavelength λ$i$ from the wavelength filter 59-$i$ to perform predetermined reception processing, and each transmitter 60-$i$ is used to generate an upstream signal light of the upstream wavelength λup to send it out to the wavelength superimposing device 47.

Operations of the WDM-PON system 51 constituted as described above will be described below. In the downstream direction, a signal light of the wavelength λ$i$ generated by the transmitter 54-$i$ of the OLT 52 is multiplexed by the WDM coupler 56 before being transmitted through the wavelength filter 57 and transmitted to the wavelength superimposing device 47.

In the wavelength superimposing device 47, as described above, among input wavelength-multiplexed lights, a light of one wavelength λi is reflected after another by the wavelength filter 50-i before being transmitted through the wavelength filter 48 and transmitted to the ONU 53-i via the output port.

Then, in the ONU 53-i, as described above, a downstream signal light of the wavelength λi received from the wavelength superimposing device 47 is reflected by the wavelength filter 59 toward the receiver 58-i, where reception processing is performed.

In the upstream direction, on the other hand, an upstream signal light of the wavelength λup generated by the transmitter 60-i of the ONU 53-i is transmitted through the wavelength filter 59 before being transmitted to the wavelength superimposing device 47. That is, in the present modification, the wavelength of an upstream direction signal light is set to the wavelength λup to be reflected by the video filter 62 of the wavelength superimposing device 47.

Therefore, after an upstream signal light sent out from the ONU 53-i is input into the output port of the wavelength superimposing device 47, as described above, the upstream signal light is reflected in the order of the wavelength filter 48, reflecting mirror 49-i, and wavelength filter 48 before being transmitted to the OLT 52 via the input port.

Then, in the OLT 52, the upstream signal light received from the wavelength superimposing device 47 is reflected by the wavelength filter 57 toward the receiver 55, where reception processing is performed.

As has been described above, according to the WDM-PON system 51 in the present modification, a wavelength-multiplexed light of the wavelengths λ1 to λN can be spectrally separated (reflected) by wavelength λi by the wavelength filter 50-i in the wavelength superimposing device 47 for transmission in the downstream direction to the ONU 53-i and thus, downstream optical communication equivalent to that of a related WDM-PON system can be realized at a lower loss.

Then, in the upstream direction, by selecting the upstream wavelength λup as a wavelength that is different from any of the downstream wavelengths λ1 to λN and using internal multiple reflection of a light of the upstream wavelength λup by the wavelength filter 48 and reflecting mirror 49-i, upstream optical communication can also be realized correctly at a lower loss.

That is, the bidirectional WDM-PON system 51 can be realized at a lower loss, on a smaller scale, and at a lower cost than before.

Since wavelength management becomes unnecessary on the ONU 53-i side by setting the same wavelength λup as the upstream wavelength for each ONU 53-i as described above, the same type (wavelength) laser diode (LD) can be used for each ONU 53-i, contributing to further cost reduction.

In addition, since the OLT 52 also need not have the receiver 55 for each wavelength, equipment can be simplified and further cost reduction is possible.

[G] Description of a Second Modification of the WDM-PON System

Next, a WDM-PON system, in which the downstream wavelengths are λ1 to λN and the upstream wavelength is λup, as described in the first modification, that can broadcast a video signal light of the wavelength λvideo to each ONU will be described below with reference to FIGS. 12 to 14. Here, it is assumed that λup<λ1 to λN<λvideo.

Figure 14:
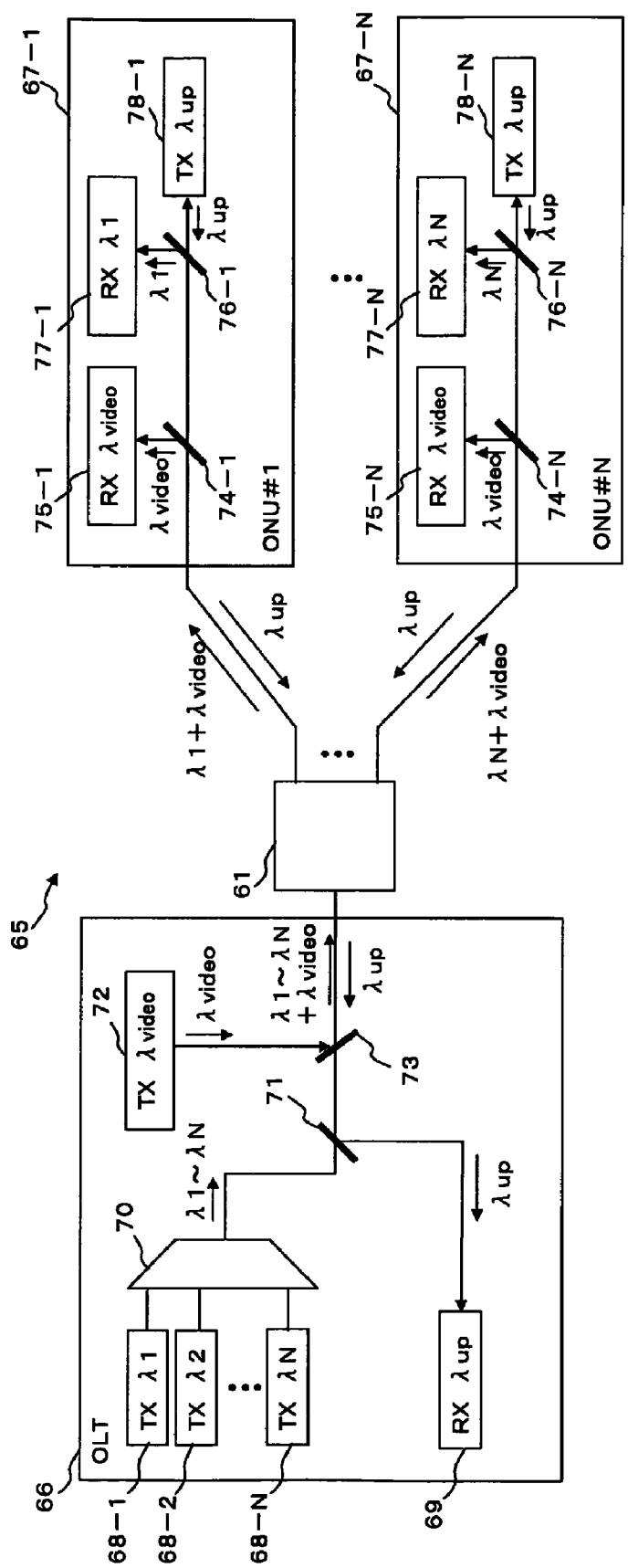
FIG. 14 is a block diagram showing the configuration of the main portion of a WDM-PON system using the wavelength superimposing device shown in FIG. 12.
Figure 15:
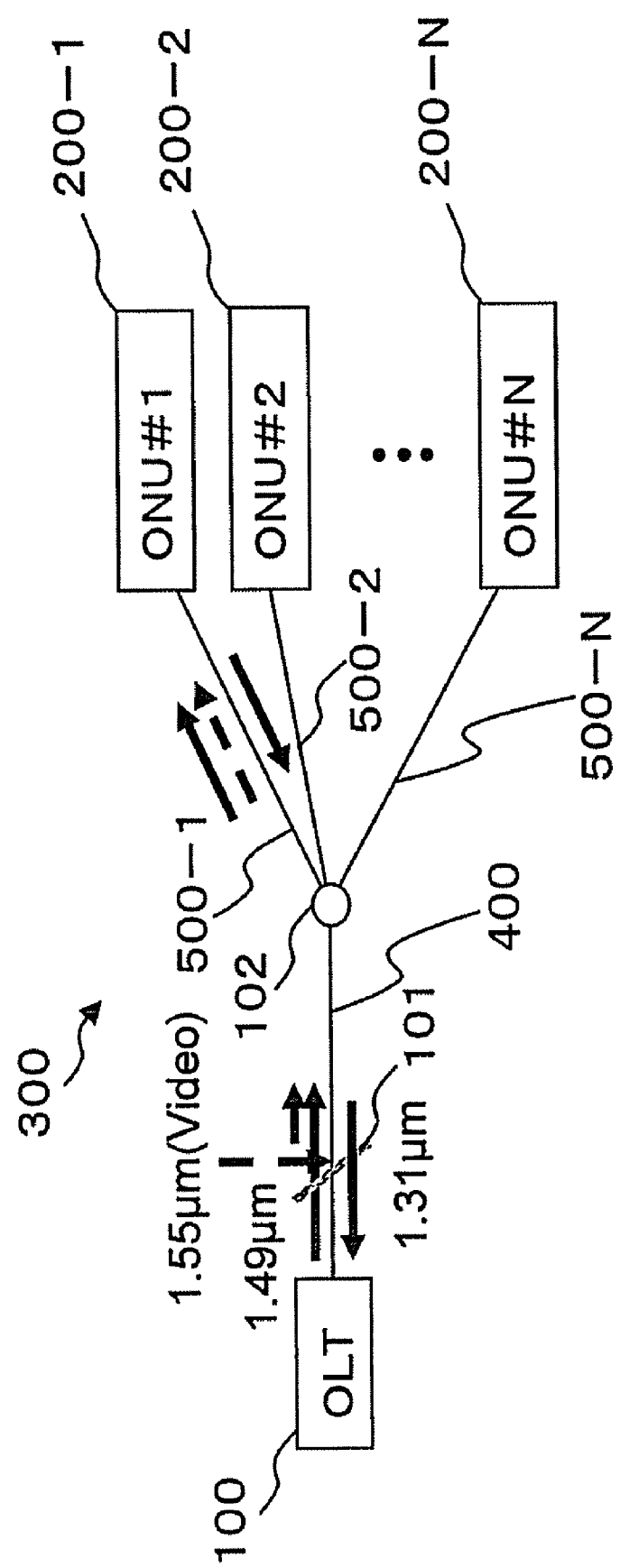
FIG. 15 is a diagram illustrating an example of the configuration of a related PON system.
Figure 17:
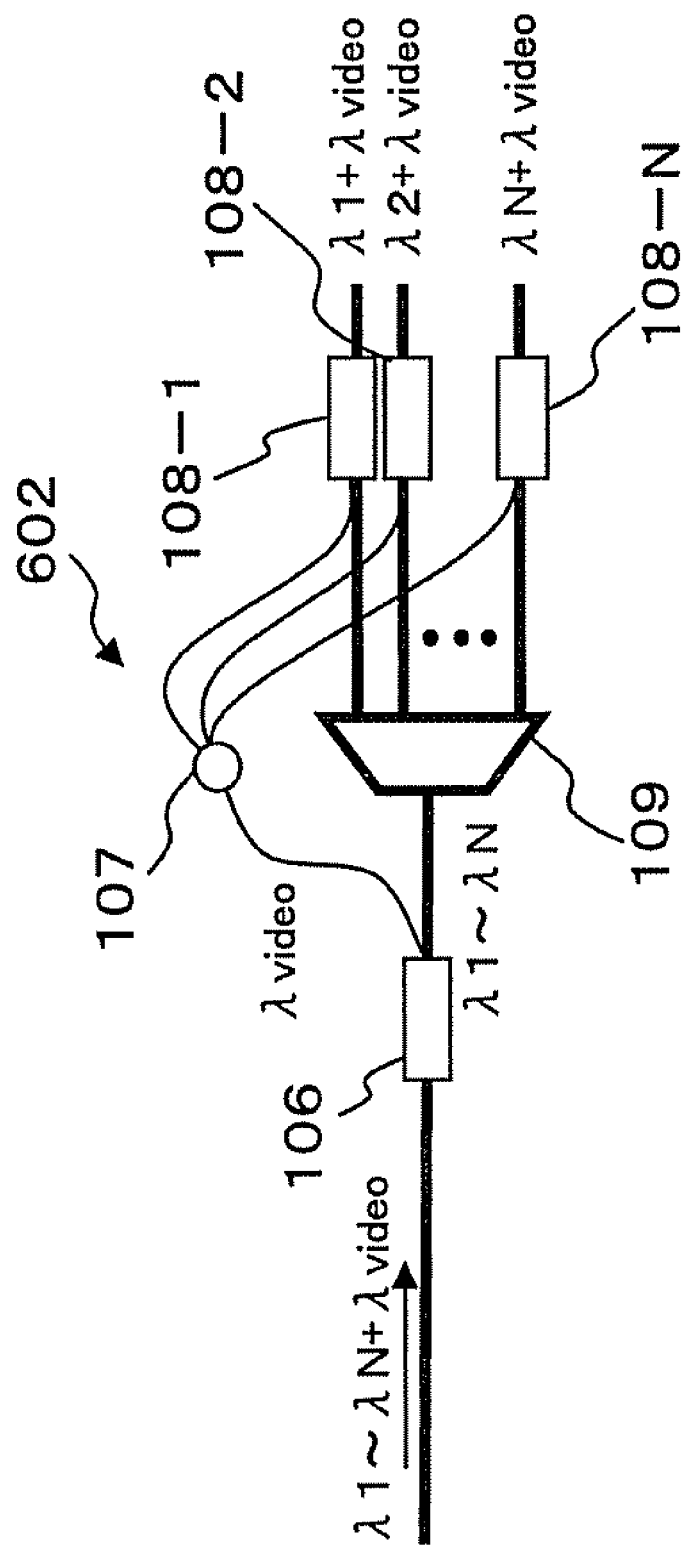
FIG. 17 is a diagram illustrating an example of the configuration of a related multiplexing/demultiplexing device.

FIG. 14 is a block diagram showing a second modification of the WDM-PON system. A WDM-PON system 65 shown in FIG. 14 also comprises, for example, a plurality of ONU 67-1 to 67-N, an OLT 66 for transmitting a light of a plurality of wavelengths (λ1 to λN, λvideo) to be transmitted to the plurality of ONU 67-i after wavelength-multiplexing, and a wavelength superimposing device 61 that, while receiving a downstream signal light (wavelength-multiplexed light) from the OLT 66 to transmit the downstream signal light to the ONU 67-i, receives an upstream signal light from each ONU 67-i to transmit the upstream signal light to the OLT 66.

Accordingly, the OLT 66 in the present example comprises, for example, transmitters 68-1 to 68-N for each downstream wavelength λi, a receiver 69 for the upstream wavelength sup, a WDM coupler 70, wavelength filters 71 and 73, and a video signal light transmitter 72, and each ONU 67-i comprises a wavelength filter 74-i, a video signal light receiver 75-i, a wavelength filter 76-i, a receiver 77-i for the downstream wavelength λi, and a transmitter 78-i for the upstream wavelength sup, and further the wavelength superimposing device 61 is constituted such that a light of the wavelength λvideo can be branched off to the output port corresponding to each ONU 67-i and when a light of the upstream wavelength λup is input into the output port, the light of the upstream wavelength λup can be transmitted to the input port.

Figure 12:
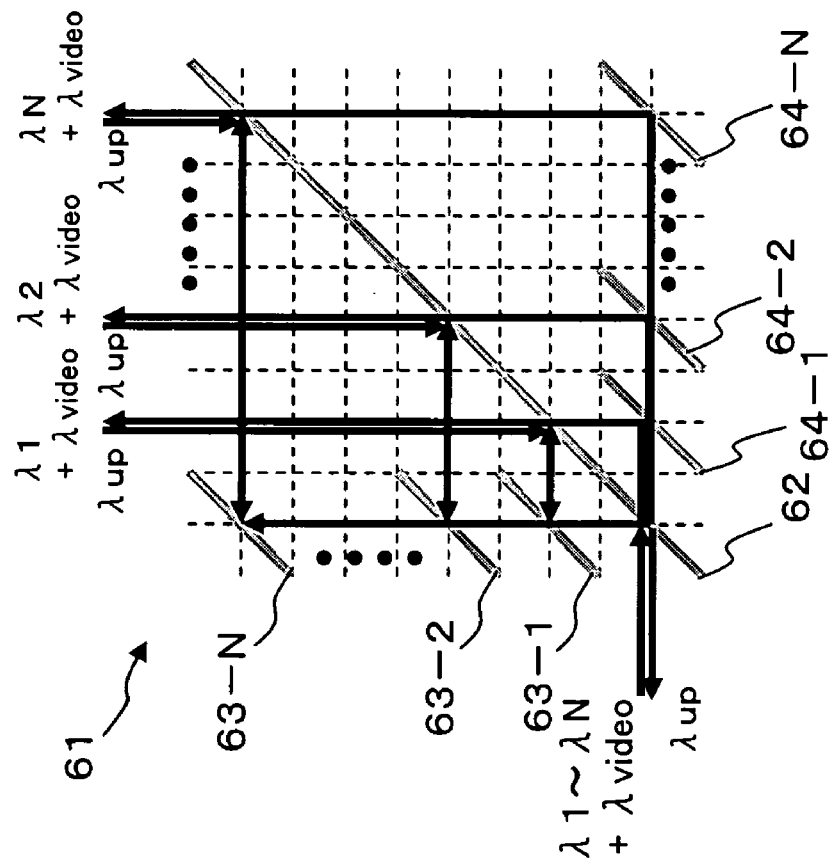
FIG. 12 is a schematic diagram showing the configuration of a wavelength superimposing device used in the second modification of the WDM-PON system according to the present embodiment together with optical paths.

Thus, the wavelength superimposing device 61 in the present modification comprises, as shown in FIG. 12 for example, a wavelength filter (filter device) 62, reflecting mirrors (reflecting elements) 63-1 to 63-N, and wavelength filters (filter elements) 64-1 to 64-N. However, physical relationships of these components are the same as, for example, those shown in FIG. 1 (That is, the wavelength superimposing device 61 in the present example has the same physical structure as that of the previously-described wavelength superimposing device 1).

Figure 13:
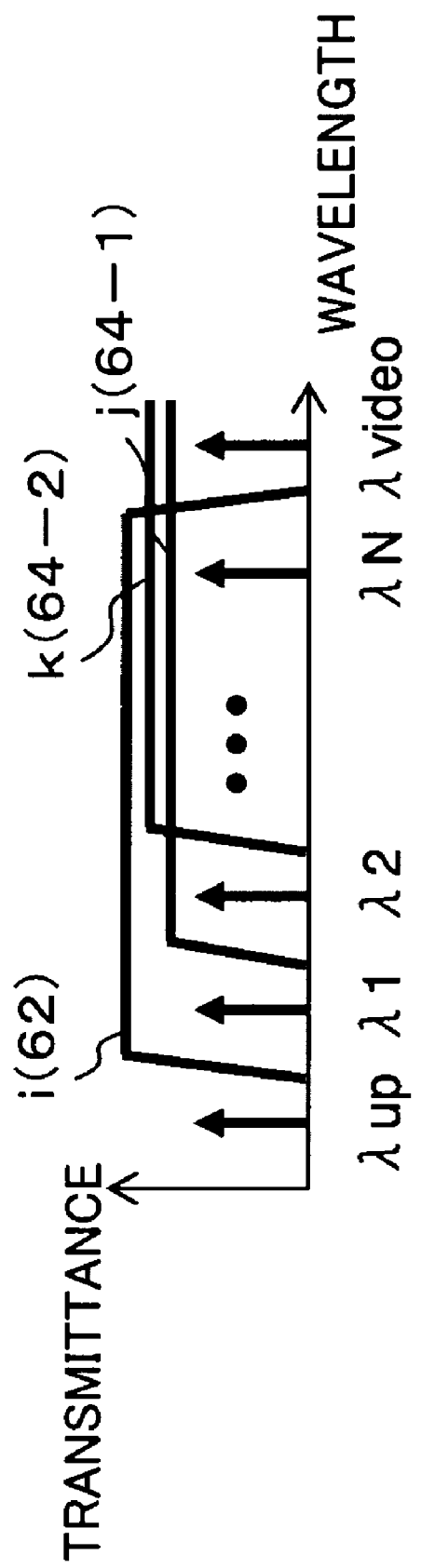
FIG. 13 is a diagram showing the filter characteristic of a wavelength filter shown in FIG. 12.

Here, the wavelength filter 62 has filter characteristics that, as shown, for example, by a symbol i in FIG. 13, a light of the upstream wavelength λup and that of the wavelength λvideo are reflected and a light of other wavelengths (λ1 to λN) is transmitted, and by being arranged such that the incidence angle of an input light becomes 45°, as shown in FIG. 12, among lights input from the OLT 66 after wavelength-multiplexing a video signal light of the downstream wavelength λvideo to be delivered (broadcasted) to the ONU 67-i and a signal light of the downstream wavelengths λ1 to λN to be transmitted to the individual ONU 67-i by wavelength λi, the video signal light of the wavelength λvideo is reflected in a direction symmetrical to a normal to a reflecting surface thereof (in the present modification, a direction perpendicular to the incidence direction) (that is, to the reflecting mirror 63-1 side) and a light of the other downstream wavelengths λ1 to λN is transmitted to the wavelength filter 64-i side. Also, an upstream direction signal light transmitted from the ONU 67-i, which is an upstream signal light of the upstream wavelength λup incident from the opposite direction of a light of the wavelengths λ1 to λN emitted from the wavelength superimposing device 61, is reflected toward the reflecting mirror 63-i, as already described using FIG. 9.

The reflecting mirror 63-i is arranged on the side of the reflecting surface of the wavelength filter (referred to as the video filter below) 62, more specifically, on an optical path of the video signal light reflected by the video filter 62 in parallel with the video filter 62 at regular intervals. Also in the present example, like the wavelength superimposing device 1 described referring to FIG. 1, the reflecting mirror 63-i is constituted as a 1/N reflecting mirror that reflects a portion (1/N) of the video signal light reflected by the video filter 62 toward the reflecting surface of the video filter 62 and transmits remaining light to the reflecting mirror 63-2 in the next stage, and the reflecting mirror 63-2 is constituted as a 1/(N−1) reflecting mirror that reflects a further portion (1/(N−1)) of the video signal light that is transmitted through the reflecting mirror 63-1 in the previous stage toward the reflecting surface of the video filter 62 and transmits remaining light to the reflecting mirror 63-i in the next stage. Similarly, each remaining reflecting mirror 63-i has properties that a portion of the video signal light transmitted through the reflecting mirror 63-(i−1) in the previous stage is reflected toward the reflecting surface of the video filter 62 and remaining light is transmitted to the reflecting mirror 63-(i+1) in the next stage.

That is, the reflecting mirror 63-i is constituted as a 1/(N−i+1) reflecting mirror that reflects 1/(N−i+1) of the video signal light reflected by the video filter 62 and transmits remaining light, and this branches off power of the video signal light evenly to cause each video signal light to be re-incident on a plurality of locations (N locations) of the reflecting surface of the video filter 62 in parallel. Meanwhile, as the reflecting mirror 63-N in the last stage, a simple total reflection mirror may be used.

That is, each reflecting mirror 63-i is provided on the side of the reflecting surface of the video filter 62 and constitutes a first optical system (first reflective optical system) in which a video signal light (reflected light) reflected by the video filter 62 is incident on a plurality (N) of incident positions on the reflecting surface of the video filter 62. Then, to cause the video signal light (reflected light) to be incident on each of the incident positions in parallel with the input wavelength-multiplexed light after reflecting multiple (N) times at spatially different positions on optical paths thereof, for example, each reflecting mirror 63-i is constituted as a reflecting mirror (half mirror) that reflects at least a portion of the reflected light (video signal light) toward the incident position. Meanwhile, these reflecting mirrors 63-i have a length such that optical paths of light of each wavelength $\lambda 1$ to $\lambda N$ reflected by each wavelength filter 64-i are not obstructed.

Next, each wavelength filter 64-i is arranged in parallel with the video filter 62 at regular intervals (the same intervals as arrangement intervals of the reflecting mirror 63-i) at least on optical paths of transmitted light on the side of the transmission surface of the video filter 62, and for example, the wavelength filter 64-1 has filter characteristics (See a symbol j in FIG. 13) that, among the transmitted lights (wavelengths $\lambda 1$ to $\lambda N$) of the video filter 62, a light of the wavelength $\lambda 1$ is reflected toward the video filter 62 and a light of remaining wavelengths $\lambda 2$ to $\lambda N$ is transmitted to the wavelength filter 64-2 in the next state, and the wavelength filter 64-2 has filter characteristics (See a symbol k in FIG. 13) that a light of the wavelength $\lambda 2$ of the transmitted light (wavelengths $\lambda 2$ to $\lambda N$) of the wavelength filter 64-1 is reflected toward the video filter 62 and a light of remaining wavelengths $\lambda 3$ to $\lambda N$ is transmitted to the wavelength filter 64-3 in the next stage.

Similarly, each remaining wavelength filter 64-i has filter characteristics that, among the transmitted lights of the wavelength filter 64-(i−1) in the previous stage, a light of a specific wavelength is reflected toward the video filter 62 and a light of remaining wavelengths is transmitted to the wavelength filter 64-(i+1) in the next state. However, the wavelength filter 64-N in the last stage is constituted as a total reflection mirror having properties that a light of the wavelength $\lambda N$ is totally reflected toward the video filter 62.

That is, the wavelength filter 64-L has properties that a light of the wavelength $\lambda L$ of the transmitted light from the video filter 62 is reflected and a light of other remaining wavelengths is transmitted, and this mechanism separates one wavelength at a time from the transmitted light of the video filter 62 using the wavelength filter 64-i at a spatially different location before being reflected toward the video filter 62.

Here, since each wavelength filter 64-i is arranged at the same intervals as arrangement intervals of the reflecting mirror 63-i, each light reflected by each wavelength filter 64-i is incident on the video filter 62 from the surface (transmission surface) side opposite to the reflecting surface of the video filter 62 at the same position as the position where a video signal light reflected by each reflecting mirror 63-i is re-incident on the video filter 62 and, as a result, a light obtained by superimposing the video signal light on a light of each wavelength $\lambda 1$ to $\lambda N$ is output as an output light of the wavelength superimposing device 61.

Therefore, among wavelength-multiplexed lights obtained by wavelength-multiplexing a signal light of the wavelengths $\lambda 1$ to $\lambda N$ input from the OLT 66 via the input port and a video signal light of the wavelength $\lambda$video, the video signal light of the wavelength $\lambda$video is reflected by the video filter 62 toward the reflecting mirror 63-i and a wavelength-multiplexed light of the remaining wavelengths $\lambda 1$ to $\lambda N$ is transmitted through the video filter 62.

Then, the video signal light is evenly branched off in power by each reflecting mirror 63-i and each branched video signal light is reflected in parallel toward the video filter 62 so that each reflected light is incident on a spatially different location of the reflecting surface of the video filter 62 at regular intervals.

The signal light of the wavelengths $\lambda 1$ to $\lambda N$, on the other hand, is spectrally separated by each wavelength filter 64-i to obtain a light of one wavelength at a time and the light of each separated wavelength is reflected toward the video filter 62 and then incident on the same position as the re-incident position of the video signal light of the video filter 62.

Through this mechanism, at each re-incident position of the video filter 62, the video signal light of the wavelength $\lambda$video is superimposed (multiplexed) on the signal light of respective wavelengths $\lambda 1$ to $\lambda N$ to obtain each light ($\lambda 1+\lambda$video, $\lambda 2+\lambda$video, ..., $\lambda N+\lambda$video), which will be output from a plurality (N) of output ports of the wavelength superimposing device 61.

Conversely, a light of the upstream wavelength $\lambda$up input into the output port from the ONU 67-i is incident on the wavelength filter 62 in a direction opposite to the transmission direction of the downstream wavelength $\lambda$i, is reflected by the video filter 62 before being incident on the reflecting mirror 63-i, is further reflected by the reflecting mirror 63-i before being re-incident on the incident position of the downstream wavelength $\lambda$i on the video filter 62, and is finally reflected by the wavelength filter 62 again before being transmitted to the OLT 66 via the input port.

In the OLT 66, each transmitter 68-i is used to generate a signal light of the wavelength $\lambda$i addressed to the ONU 67-i to send it out to the WDM coupler 70 and the receiver 69 is used to receive a signal light of the upstream wavelength Sup from the ONU 67-i to perform predetermined reception processing.

The WDM coupler 70 is used to multiplex a signal light of the wavelength $\lambda$i from the transmitter 68-i to send it out to the wavelength filter 71. The wavelength filter 71 has filter characteristics that a light of the downward wavelengths $\lambda 1$ to $\lambda N$ is transmitted and a light of the upstream wavelength $\lambda$up is reflected, and by being arranged on the output side of the WDM coupler 70, as shown in FIG. 14, a light of the downward wavelength $\lambda$i from the WDM coupler 70 is transmitted to the wavelength superimposing device 61 and a light of the upstream wavelength λup from the wavelength superimposing device 61 is reflected to the receiver 69. That is, the wavelength filter 71 functions as a separation means for separating upstream direction signal lights from downstream direction signal lights.

Further, the video signal light transmitter (TX λvideo) 72 is used to generate a video signal light of the wavelength λvideo to be broadcasted to the ONU 67-*i* to send out the video signal light to the wavelength filter 73.

The wavelength filter 73 is used to superimpose (multiplex) a video signal light from the video signal light transmitter 72 on a wavelength-multiplexed light of the wavelengths λ1 to λN from the wavelength filter 71 and has, for example, filter characteristics that a video signal light of the wavelength λvideo is reflected and a light of the wavelengths λ1 to λN is transmitted.

In the ONU 67-*i*, on the other hand, the wavelength filter 74-*i* has filter characteristics that, among wavelength-multiplexed lights obtained by wavelength-multiplexing a signal light of the downstream wavelength λi from the wavelength superimposing device 61 and a video signal light of the wavelength λvideo, the video signal light of the wavelength λvideo is reflected and sent it out to the video signal light receiver (RX λvideo) 75-*i* and the light of the wavelength λi is transmitted and sent out to the wavelength filter 76-*i*.

The video signal light receiver 75-*i* is used to receive a video signal light from the wavelength filter 74-*i* to perform predetermined reception processing.

The wavelength filter 76-*i* has filter characteristics that a light of the wavelength λi is reflected and a light of the wavelength λup is transmitted, and by being arranged on the output side of the transmitter 78-*i*, as shown in FIG. 14, a signal light of the downstream wavelength λi from the wavelength superimposing device 61 is reflected toward the receiver 77-*i* and a light of the upstream wavelength λup from the transmitter 78-*i* is transmitted to the wavelength superimposing device 61. That is, the wavelength filter 76-*i* functions as a separation means for separating upstream signal lights from downstream signal lights.

Each receiver 77-*i* is used to receive a signal light of the wavelength λi from the wavelength filter 76-*i* to perform predetermined reception processing, and each transmitter 78-*i* is used to generate an upstream signal light of the upstream wavelength λup to send it out to the wavelength superimposing device 61.

Operations of the WDM-PON system 65 constituted as described above will be described below. In the downstream direction, a signal light of the wavelength λi generated by the transmitter 68-*i* of the OLT 66 is multiplexed by the WDM coupler 70 before being input into the wavelength filter 73 via the wavelength filter 71 as a wavelength-multiplexed light. In the wavelength filter 73, by transmitting a wavelength-multiplexed light of the wavelengths λ1 to λN and reflecting a video signal light of the wavelength λvideo generated by the video signal light transmitter 72, a video signal light of the wavelength λvideo is superimposed (wavelength-multiplexed) on a wavelength-multiplexed light of the wavelengths λ1 to λN and the wavelength-multiplexed light is sent to the wavelength superimposing device 61.

In the wavelength superimposing device 61, among input wavelength-multiplexed lights obtained by wavelength-multiplexing a signal light of the wavelengths λ1 to λN and a video signal light of the wavelength λvideo, as described above, the signal light of the wavelength λi is transmitted to the corresponding ONU 67-*i* together with the video signal light of the wavelength λvideo (by wavelength-multiplexing).

Then, in the ONU 67-*i*, the wavelength-multiplexed light (wavelengths λi+λvideo) from the wavelength superimposing device 61 is input into the wavelength filter 74-*i*, the signal light of the wavelength λi is transmitted to the wavelength filter 76-*i*, and the video signal light of the wavelength λvideo is reflected before being input into the video signal light receiver 75-*i* to perform predetermined reception processing.

Also, the signal light of the wavelength λi is output by the wavelength filter 76-*i* to the receiver 77-*i*, where predetermined reception processing is performed.

In the upstream direction, on the other hand, an upstream signal light of the wavelength λup generated by the transmitter 78-*i* in the ONU 67-*i* is transmitted through the wavelength filters 76-*i* and 74-*i* before being transmitted to the wavelength superimposing device 61.

Therefore, after an upstream signal light sent out from the ONU 67-*i* is input into the output port of the wavelength superimposing device 61, as described above, the upstream signal light is reflected in the order of the wavelength filter 62, reflecting mirror 63-*i*, and wavelength filter 62 before being transmitted to the OLT 66 via the input port.

Then, in the OLT 66, the upstream signal light received from the wavelength superimposing device 61 is transmitted through the wavelength filter 73 and reflected by the wavelength filter 71 toward the receiver 69, where reception processing is performed.

As has been described above, according to the WDM-PON system 65 in the present modification, a video signal light of the wavelength λvideo can be superimposed on each signal light of the wavelengths λ1 to λN addressed to each ONU 67-*i* by the wavelength superimposing device 61 for transmission in the downstream direction and thus, without requiring a discrete component, delivery (broadcast) of a video signal light to each ONU 67-*i* can be realized and downstream optical communication equivalent to that of a related WDM-PON system can be realized at a lower loss.

Then, in the upstream direction, by selecting the upstream wavelength λup as a wavelength that is different from any of the downstream wavelengths λ1 to λN and using internal multiple reflection of a light of the upstream wavelength λup by the wavelength filter 62 and reflecting mirror 63-*i*, upstream optical communication can also be realized correctly at a lower loss in the same wavelength superimposing device 61.

That is, the bidirectional WDM-PON system 65 can be realized at a lower loss, on a smaller scale, and at a lower cost than before.

Since wavelength management becomes unnecessary on the ONU 67-*i* side by setting the same wavelength λup as the upstream wavelength for each ONU 67-*i* as described above, the same type (wavelength) laser diode (LD) can be used for each ONU 67-*i*, contributing to further cost reduction.

In addition, since the OLT 66 also needs not have the receiver 69 for each wavelength, equipment can be simplified and further cost reduction is possible.

So far, an embodiment of the present invention has been described in detail, but the present invention is not limited to the above-described embodiment and can be carried out in any modification without departing from the scope and spirit of the present invention.

For example, in the above-described embodiment and modifications thereof, the incidence angle of the input wavelength-multiplexed light may be an angle other than 45°.

Also, the embodiment and modifications thereof in which a case of the wavelength multiplexed number N=4 was used for description can naturally be extended to a larger number N.

What is claimed is:

1. A wavelength superimposing device, comprising:
   a filter device that reflects a light of a portion of wavelengths of an input wavelength-multiplexed light in a direction different from an optical path direction of the input wavelength-multiplexed light and transmits a light of remaining wavelengths;
   a first optical system in which a reflected light reflected by the filter device is re-incident on a plurality of incident positions on a reflecting surface of the filter device;
   and a second optical system in which a transmitted light from the filter device is spectrally separated for each wavelength and each separated light is incident on the plurality of incident positions, on which the reflected light is re-incident, on the reflecting surface of the filter device.

2. The wavelength superimposing device according to claim 1, wherein
   the first optical system
   is constituted as a first reflective optical system in which the reflected light is reflected at spatially different positions before each reflected light is incident on the incident positions in parallel with the input wavelength-multiplexed light and
   the second optical system
   is constituted as a second reflective optical system in which the transmitted light is reflected at spatially different positions for each of the wavelengths before a light of each wavelength is incident on the incident positions.

3. The wavelength superimposing device according to claim 2, wherein
   the first reflective optical system
   is constituted by comprising a plurality of reflector elements provided at different positions on an optical path of the reflected light to reflect at least a portion of the reflected light toward the incident position and
   the second reflective optical system
   is constituted by comprising a plurality of filter elements provided at different positions on an optical path of the transmitted light to reflect a light of any wavelength contained in the transmitted light toward the incident position and to transmit a light of remaining wavelengths.

4. The wavelength superimposing device according to claim 3, wherein
   each of the filter device, the reflector element in the first reflective optical system, and the filter element in the second reflective optical system is constructed from a dielectric multilayer filter formed on a substrate and
   each of the substrates is laminated with the filter device taking a central position.

5. The wavelength superimposing device according to claim 4, wherein each of the substrates has the same thickness.

6. The wavelength superimposing device according to claim 4, wherein the dielectric multilayer filter, which is the reflector element of the first reflective optical system, is formed in a portion of an area on the substrate so that an optical path of the reflected light by the filter element of the second reflective optical system is not obstructed.

7. The wavelength superimposing device according to claim 1, wherein a light of the portion of wavelengths reflected by the filter device is a signal light in a downstream direction to be delivered to a plurality of optical network units constituting a WDM network system and a light of the remaining wavelengths transmitted through the filter device is a signal light in the downstream direction to be transmitted to the individual optical network units by each wavelength.

8. The wavelength superimposing device according to claim 1, wherein
   the filter device
   has properties that a light incident on the incident position from a direction opposite to the reflected light is reflected in an opposite direction on a re-incident path of the reflected light and
   the first reflective optical system
   has properties that each light reflected in the opposite direction from the incident position of the filter device is output in the opposite direction of the input wavelength-multiplexed light from the incident position of the input wavelength-multiplexed light.

9. The wavelength superimposing device according to claim 8, wherein a light incident on the incident position of the filter device from the opposite direction of the reflected light is an upstream direction signal light transmitted from one of a plurality of optical network units constituting a WDM network system.

10. The wavelength superimposing device according to claim 9, wherein the upstream direction signal light is a light of the same wavelength as one of the remaining wavelengths transmitted through the filter device.

11. The wavelength superimposing device according to claim 9, wherein the upstream direction signal light is a light of a wavelength other than each wavelength of the input wavelength-multiplexed light into the filter device.

12. The wavelength superimposing device according to claim 1, wherein the portion of light reflected by the filter device is a video signal light.

13. The wavelength superimposing device according to claim 1, wherein an incidence angle of the input wavelength-multiplexed light with the reflecting surface of the filter device is set to 45.

14. A WDM network system, comprising:
    a plurality of optical network units; an optical line terminal that transmits a light of a plurality of wavelengths to be transmitted to the plurality of optical network units by wavelength-multiplexing; and a wavelength superimposing device that receives a wavelength-multiplexed light from the optical line terminal and transmits the wavelength-multiplexed light to the plurality of optical network units, wherein the wavelength superimposing device comprising: a filter device that reflects a light of a portion of wavelengths of an input wavelength-multiplexed light, which is a downstream direction signal light from the optical line terminal, in a direction different from an optical path direction of the input wavelength-multiplexed light as a light to be delivered to the plurality of optical network units and transmits a light of remaining wavelengths as a light to be transmitted to the individual optical network units by each wavelength;
    a first optical system in which a reflected light reflected by the filter device is re-incident on a plurality of incident positions on a reflecting surface of the filter device;
    and a second optical system in which a transmitted light from the filter device is spectrally separated for each wavelength and each separated light is incident on the plurality of incident positions, on which the reflected light is re-incident, on the reflecting surface of the filter device.

15. The WDM network system according to claim 14, wherein
    the filter device has properties that an upstream direction signal light transmitted from the optical network unit and incident on the incident position from an opposite direction of the reflected light is reflected in the opposite direction on a re-incident path of the reflected light and the first optical system has properties that each of the upstream direction signal lights reflected in the opposite direction from the incident position of the filter device is output in the opposite direction of the input wavelength-multiplexed light from the incident position of the input wavelength-multiplexed light to the optical line terminal.

16. The WDM network system according to claim 15, wherein the upstream direction signal light is a light of the same wavelength as one of the remaining wavelengths that are transmitted through the filter device and each of the optical line unit and optical network units comprises a separation means for separating the upstream direction signal lights from the downstream direction signal lights.

17. The WDM network system according to claim 16, wherein the upstream direction signal light is a light of a wavelength other than each wavelength of the downstream direction signal light into the filter device.

18. The WDM network system according to claim 14, wherein the portion of light reflected by the filter device is a video signal light.

19. The WDM network system according to claim 14, wherein an incidence angle of the input wavelength-multiplexed light with the reflecting surface of the filter device is set to 45.

* * * * *